United States Patent
Kitayama et al.

(10) Patent No.: US 8,401,373 B2
(45) Date of Patent: Mar. 19, 2013

(54) BROADCAST PROGRAM RESERVATION APPARATUS, BROADCAST PROGRAM RESERVATION METHOD, AND PROGRAM THEREOF

(75) Inventors: Takefumi Kitayama, Kanagawa (JP); Hideki Asazu, Tokyo (JP); Takehisa Souraku, Kanagawa (JP); Yasushi Tsuruta, Tokyo (JP)

(73) Assignee: Sony Corporation (JP)

( * ) Notice: Subject to any disclaimer, the term of this patent is extended or adjusted under 35 U.S.C. 154(b) by 1229 days.

(21) Appl. No.: 11/732,479

(22) Filed: Apr. 2, 2007

(65) Prior Publication Data

US 2008/0002943 A1 Jan. 3, 2008

(30) Foreign Application Priority Data

Apr. 5, 2006 (JP) ................................. P2006-103983

(51) Int. Cl.
 *H04N 5/76* (2006.01)
(52) U.S. Cl. ........................................ 386/293; 386/291
(58) Field of Classification Search ........................ None
 See application file for complete search history.

(56) References Cited

U.S. PATENT DOCUMENTS

| 5,805,763 | A | 9/1998 | Lawler et al. | |
| 6,185,360 | B1* | 2/2001 | Inoue et al. | 386/248 |
| 7,017,179 | B1* | 3/2006 | Asamoto et al. | 725/152 |
| 2002/0044659 | A1* | 4/2002 | Ohta | 380/241 |
| 2002/0106185 | A1* | 8/2002 | Fujii et al. | 386/46 |
| 2003/0154493 | A1 | 8/2003 | Kagle et al. | |
| 2003/0219228 | A1 | 11/2003 | Thiagarajan et al. | |
| 2004/0060076 | A1* | 3/2004 | Song | 725/145 |
| 2005/0010949 | A1* | 1/2005 | Ward et al. | 725/42 |
| 2006/0140581 | A1* | 6/2006 | Inoue et al. | 386/83 |
| 2007/0122108 | A1* | 5/2007 | Bontempi | 386/83 |

FOREIGN PATENT DOCUMENTS

| JP | 2000-341593 A | 12/2000 |
| JP | 2002-354354 A | 12/2002 |
| JP | 2003-189214 A | 7/2003 |
| JP | 2003-333481 A | 11/2003 |
| JP | 2006-080974 A | 3/2006 |
| WO | 2004088457 A2 | 10/2004 |
| WO | 2005041572 A1 | 5/2005 |

OTHER PUBLICATIONS

Partial European Search Report EP 07105768, dated Aug. 22, 2011.
European Search Report EP 07105768, dated Jun. 11, 2012.

* cited by examiner

*Primary Examiner* — William C Vaughn, Jr.
*Assistant Examiner* — Eileen Adams
(74) *Attorney, Agent, or Firm* — Lerner, David, Littenberg, Krumholz & Mentlik, LLP

(57) ABSTRACT

A broadcast program reservation apparatus is disclosed. The broadcast program reservation apparatus may include a reception unit, a reservation unit, and a determination unit. The reception unit may receive a broadcast program and electronic program information. The reservation unit may execute a reserve-recording process of recording the program based on the electronic program information which has been received. The determination unit may determine whether or not a reservation candidate program as a candidate of the program is caused to be reserve-recorded by the reservation unit corresponding to a plurality of broadcast patterns of the program in a predetermined time period.

19 Claims, 16 Drawing Sheets

(Sim) Program to be compared (having high similarity)

| Future detection pattern \ Past detection pattern | Past detection pattern 1 | Past detection pattern 2 | Past detection pattern 3 |
|---|---|---|---|
| Future detection pattern 1 | Not determined | Not determined | Determined |
| Future detection pattern 2 | Not determined | Determined | Determined |
| Future detection pattern 3 | Determined | Determined | Determined |
| Future detection pattern 4 | Not determined | Determined | Determined |

FIG.9

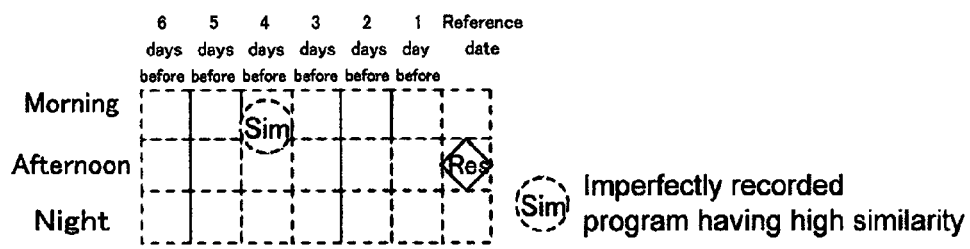
FIG.11A
FIG.11B
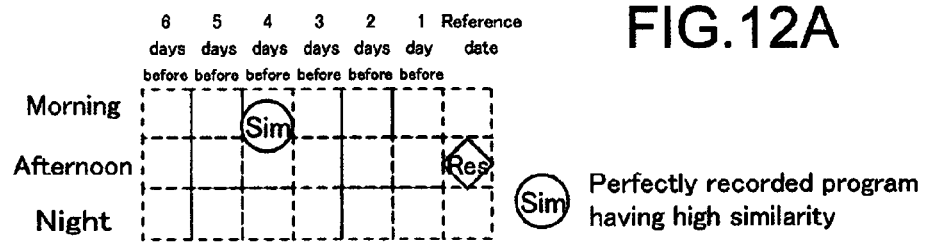
FIG.12A
FIG.12B
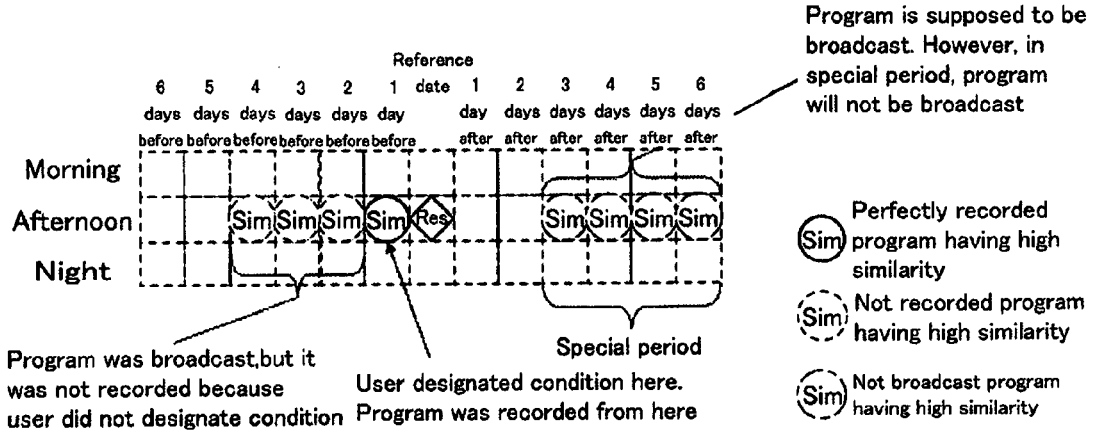
FIG.13

| Program title | "Of course, you can laugh out." |
|---|---|
| Broadcast time 1 | 2006/2/27 12:00~13:00 |
| Broadcast time 2 | 2006/2/28 12:00~13:00 |
| Broadcast time 3 | 2006/3/1 12:00~13:00 |
| Broadcast time 4 | 2006/3/2 12:00~13:00 |
| Broadcast time 5 | 2006/3/3 12:00~13:00 |
FIG.14
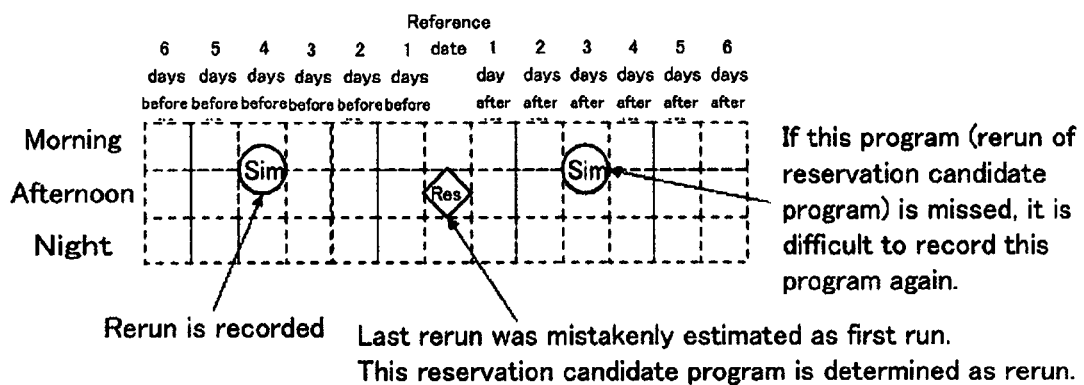
FIG.15
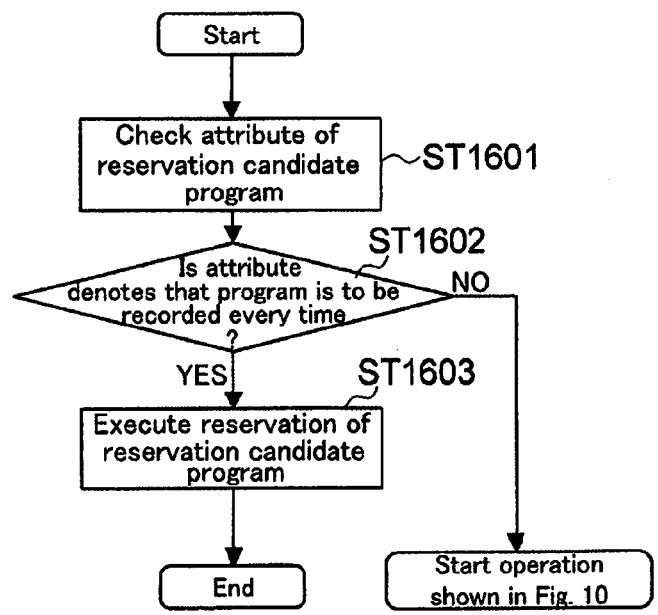
FIG.16

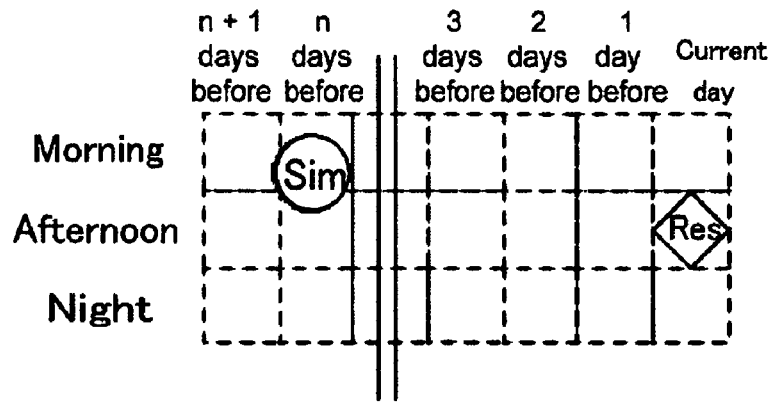
FIG.18A
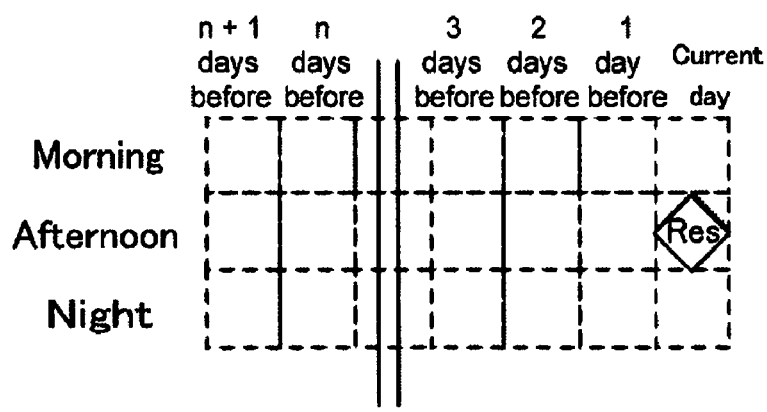
FIG.18B
|  | Executing reservation |
|---|---|
| Pattern (A) | Do not |
| Pattern (B) | Do |
FIG.19

BROADCAST PROGRAM RESERVATION APPARATUS, BROADCAST PROGRAM RESERVATION METHOD, AND PROGRAM THEREOF

CROSS-REFERENCE TO RELATED APPLICATIONS

This application claims priority from Japanese Patent Application No. JP 2006-103983 filed in the Japanese Patent Office on Apr. 5, 2006, the entire content of which is incorporated herein by reference.

BACKGROUND OF THE INVENTION

1. Field of the Invention

The present invention relates to a broadcast program reservation apparatus, a reservation method thereof, and a program thereof that reserves recording of a broadcast program such as a television broadcast program.

2. Description of the Related Art

Television broadcast program recording apparatuses that have been released in recent years have a function of receiving EPG (Electronic Program Guide) information from a broadcasting station and automatically records a program that matches with conditions designated by users as he/she pleases based on the EPG information. Conditions that the user freely designates include for example program title, keyword, genre, and broadcasting time zone. However, there is a problem in the related art that if all programs that match the designated conditions are recorded, reruns of the same program may also be recorded, resulting in wasting a limited record area and a program that matches the conditions and that will be broadcast in the same time zone as the reruns may be failed to be recorded.

So far, a rerun detection apparatus that detects whether or not a broadcast program is a rerun program has been proposed (refer to for example Japanese Patent Application Laid-Open No. 2003-333481, paragraph "0006", hereinafter, this document is referred to as the patent document 1). The patent document 1 discloses a technology that allows a program to be reserve-recorded regardless of whether or not the EPG information contains a rerun identifier for the program. In the apparatus of the patent document 1, if a program is failed to be reserve-recorded due to any cause, when the title of the program failed to be reserve-recorded matches the title of a program contained in EPG information updated later, the matched program title contained in the updated EPG information is determined to be the title of a rerun of the broadcast program which has been failed to be reserve-recorded.

In addition, a digital broadcast receiving apparatus that can determine whether or not a program that has not been correctly reserve-recorded will be rerun in the future with a series descriptor contained in a digital broadcast (refer to for example Japanese Patent Application Laid-Open No. 2002-354354, paragraph "0007", hereinafter, this document is referred to as the patent document 2) has been proposed. This series descriptor contains an identifier called "label" that represents the number of reruns of a program. Thus, the apparatus of the patent document 2 can determine whether or not a program will be rerun.

SUMMARY OF THE INVENTION

However, some programs are always broadcast with the fixed program information (i.e. title information and detailed information always being the same). Particularly, digital broadcast has such tendency.

When such programs are broadcast on daily basis, the apparatus of the patent document 2 adversely determines that they are all reruns although these are different programs.

In the apparatus of the patent document 2, it is assumed that the series descriptor is properly added to the digital broadcast. Thus, if the series descriptor is not properly added to the digital broadcast or a program that does not have a series descriptor like the analog broadcast, the apparatus of the patent document 2 is unable to detect whether or not a program will be rerun.

In view of the foregoing, it may be desirable to provide a broadcast program reservation apparatus, a reservation method thereof, and a program thereof that improve the detection accuracy of whether or not a broadcast program is a rerun.

According to an embodiment of the present invention, there is provided a broadcast program reservation apparatus. The broadcast program reservation apparatus may include a reception unit, a reservation unit, and a determination unit. The reception unit may receive a broadcast program and electronic program information. The reservation unit may execute a reserve-recording process of recording the program based on the electronic program information which has been received. The determination unit may determine whether or not a reservation candidate program as a candidate of the program is caused to be reserve-recorded by the reservation unit corresponding to a plurality of broadcast patterns of the program in a predetermined time period.

In this embodiment, the detection unit may determine whether or not a reservation candidate program is caused to be reserve-recorded corresponding to the plurality of broadcast patterns of the program. Thus, the detection accuracy of whether or not the program is a first run or a rerun can be improved.

When the determined result of the determination unit denotes that the program is a rerun, the reservation unit may not reserve-record the program. Instead, another process may be performed. When the determined result denotes that the program is a first run, the reservation unit may reserve-record the program. As a result, a first run and a rerun can be prevented from being redundantly recorded. In this specification, "first run" represents a broadcast of a program that is broadcast the first time, whereas "rerun" represents a broadcast of a program having the same contents as the first run and that is broadcast the second time or later.

"Broadcast" may include a regular television broadcast using a radio wave. In addition, "broadcast" may include a broadcast that provides a program through a network.

When a program is broadcast through a network, "broadcast" in this embodiment may represent a broadcast in the mode of a regular television broadcast. "Network" may be a line using for example the IP (Internet Protocol) of the Internet regardless of whether it is connected by a cable or wirelessly.

In this embodiment, the determination unit may determine whether or not the reservation candidate program is caused to be reserve-recorded corresponding to a past broadcast pattern of the program based on a reference time zone as a time zone in which the reservation candidate program is broadcast. In this embodiment, the broadcast program reservation apparatus can check the past broadcast pattern with the past program recorded state. When the reference time zone belongs to the future from the present time, the reservation candidate program may be reserved to be reserve-recorded as a temporary measure. On the day the reservation candidate program is broadcast, the determination unit may reference the past program recorded states and determine whether or not the reservation candidate program is caused to be reserve-recorded.

In this embodiment, the determination unit may categorize the broadcast pattern as a pattern of which there is one broadcast of a program to be compared with the reservation candidate program, a pattern of which there is one broadcast of a program to be compared with the reservation candidate program every two or more days in series, and a pattern of which there is no broadcast of a program to be compared with the reservation candidate program within a predetermined number of days earlier than a reference date on which the reservation candidate program will be broadcast, and determine whether or not the reservation candidate program is caused to be reserve-recorded.

"Program to be compared" may be a program similar to a reservation candidate program and being in the state that the broadcast program reservation apparatus has neither detected, nor known that the reservation candidate program is a first run or a rerun. In other words, "program to be compared" may be either a first run or a rerun. Thus, when the similar program is a rerun, the contents of the reservation candidate program are to be the same as those of the similar program. In this case, "same" is a lower concept of "similar".

In this embodiment, the determination unit may determine whether or not the reservation candidate program is caused to be reserve-recorded corresponding to a past broadcast pattern and a future broadcast pattern of the program based on a reference time zone as a time zone in which the reservation candidate program is broadcast. In this embodiment, not only a past broadcast pattern, but also a plurality of future broadcast patterns based on the electronic program guide may be detected. Thus, the detection accuracy of whether a program is a first run or a rerun can be improved. In this case, like the foregoing embodiment, the broadcast program reservation apparatus can check a past program broadcast pattern based on the past program recorded states.

In this embodiment, within a predetermined number of days earlier than a reference date on which the reservation candidate program may be broadcast, the determination unit may categorize the broadcast pattern as a past pattern group of a pattern of which there is one broadcast of a program to be compared with the reservation candidate program, a pattern of which there is one broadcast of a program to be compared with the reservation candidate program every two or more successive days, and a pattern of which there is no broadcast of a program to be compared with the reservation candidate program. In addition, within a predetermined number of days later than the reference date based on the reference time zone, the determination unit may categorize the broadcast pattern as a future pattern group of a pattern of which there is one broadcast of a program to be compared with the reservation candidate program, a pattern of which there is one broadcast of a program to be compared with the reservation candidate program every two or more days in series, and a pattern of which there is no broadcast of a program to be compared with the reservation candidate program. Moreover, the determination unit may determine the broadcast pattern for combinations of the patterns of the past pattern group and the patterns of the future pattern group.

In this embodiment, the broadcast program reservation apparatus may also include a series broadcast determination unit. The series broadcast determination unit may determine whether or not the reservation candidate program and a program to be compared with the reservation candidate program are broadcast in series at a predetermined time interval in a reference date on which the reservation candidate program is broadcast. When the reservation candidate program and the program to be compared are broadcast in series at the predetermined interval in the reference date on which the reservation candidate program will be broadcast, the reservation unit may reserve-record the reservation candidate program. The possibility of which programs that are broadcast in series being the first runs is high. In this embodiment, programs that will be broadcast in series may be reserve-recorded. Thus, the first run may not fail to be recorded. In this embodiment, the program to be compared may be earlier than or later than the reference time zone that is a time zone in which the reservation candidate program is broadcast.

In this embodiment, the broadcast program reservation apparatus may also include a record determination unit. The record determination unit may determine whether or not a program to be compared with the reservation candidate program was perfectly recorded. When the program to be compared was not perfectly recorded, the reservation unit may reserve-record the reservation candidate program. Thus, when the program to be compared was not perfectly recorded last time, even if the reservation candidate program is a rerun, it can be recorded. "Has been perfectly recorded" may denote that the program to be compared was recorded from the beginning to the end. When the program to be compared was not recorded from the beginning to the end with a desired picture quality and sound level because of, for example, a bad transmission state of a program broadcast wave or an abnormality of the apparatus or the record medium, it may not be said that the program to be compared was perfectly recorded.

In this embodiment, the broadcast program reservation apparatus may also include a comparison unit and a decision unit. The comparison unit may compare a record time at which the program to be compared was recorded with a broadcast time of the reservation candidate program in the electronic program information. The decision unit may decide that the program to be compared was perfectly recorded when a compared result of the comparison unit denotes that a difference between the record time and the broadcast time is within a predetermined time. Instead, when it becomes clear that the program to be compared was not perfectly recorded, information that denotes that the program to be compared was not perfectly recorded may be stored. In this case, the record determination unit may determine whether or not the program to be compared was perfectly recorded based on the information. When the transmission state of the radio wave is bad or the apparatus and so forth are abnormal, before or while the program to be compared is (being) recorded, the broadcast program reservation apparatus can know that the program to be compared was not perfectly recorded.

In this embodiment, the broadcast program reservation apparatus may also include an identification information determination unit. The identification information determination unit may determine whether or not the electronic program information contains identification information which denotes that the reservation candidate program is a rerun when a determined result of the record determination unit denotes that the program to be compared was perfectly recorded. The reservation unit may reserve-record the reservation candidate program when the electronic program information does not contain the identification information.

In this embodiment, the broadcast program reservation apparatus may also include a start time determination unit. The start time determination unit may determine whether or not a difference between a start time of the reservation candidate program and a start time of a program to be compared with the reservation candidate program is within a predetermined time. The reservation unit may reserve-record the reservation candidate program when the difference between the start times is within the predetermined time. This function may be effective in such a case where there is no program to be compared in the future and there is only one program to be compared in the past due to a special program being scheduled to broadcast in the future. In this case, when the difference between the start time of the reservation candidate program and the start time of the program to be compared is a predetermined time period, since the possibility of which the reservation candidate program is a first run is high, it can be reserve-recorded.

"Predetermined time period" may be a time length for which a short program such as a commercial message or a news program is broadcast.

In this embodiment, the broadcast program reservation apparatus may also include a priority level assignment unit and a priority level determination unit. The priority level assignment unit may assign a priority level based on which the reservation unit executes the reserve-recording process to each of a plurality of broadcast time zones of the reference date on which the reservation candidate program is broadcast. The priority level determination unit may compare a broadcast time zone of the reservation candidate program with a broadcast time zone of the program to be compared with the reservation candidate program and determine whether or not the reservation candidate program is caused to be reserve-recorded corresponding to a priority level which has been assigned. In this embodiment, when the broadcast program reservation apparatus has mistakenly reserve-recorded a rerun as a first run due to any cause, the broadcast program reservation apparatus may be prevented from mistakenly not reserve-recoding a first run that will be broadcast the next time as a rerun.

In this embodiment, the broadcast program reservation apparatus may also include an attribute assignment unit and an attribute determination unit. The attribute assignment unit may assign one of a plurality of attributes to the program. The attribute determination unit may determine an attribute to which the reservation candidate program belongs in the attributes and determine whether or not the reservation candidate program is caused to be reserve-recorded corresponding to the attribute which has been determined.

Since live programs such as news programs are hardly rerun, it is necessary to reserve-record them on daily basis. In this embodiment, such live programs may be prevented from not being reserve-recorded.

In this embodiment, the broadcast program reservation apparatus may also include a feature data generation unit and a comparison and determination unit. The feature data generation unit may generate feature data of the reservation candidate program and feature data of a program to be compared with the reservation candidate program, the reservation candidate program being a first broadcast wave of a television broadcast, the program to be compared being a second broadcast wave of the television broadcast, the first broadcast wave being different from the second broadcast wave. The comparison and determination unit may compare the feature data of the reservation candidate program with the feature data of the program to be compared and determines whether or not to cause the reservation unit to reserve-record the reservation candidate program corresponding to a compared result of the comparison and determination unit. Under the current circumstance, programs having the same contents are often broadcast with a plurality of broadcast waves. In this case, electronic program information of programs may be different in each broadcast wave. In this embodiment, features data of both waves may be compared. When the determined result denotes that they match, it can be determined that their contents being the same. Thus, programs having the same contents can be prevented from being redundantly recorded.

In this embodiment, the determination unit may determine whether or not to the reservation candidate programs having high similarity is caused to be reserve-recorded for each of a plurality of different channels of one broadcast wave. When there are two or more reservation candidate programs to be reserve-recorded, the reservation unit may reserve-record only one of the reservation candidate programs. Thus, when programs having the same contents may be broadcast over a plurality of channels, only one of them can be reserve-recorded. As a result, programs having the same contents can be prevented from being redundantly recorded.

According to an embodiment of the present invention, there is provided a broadcast program reservation apparatus which may include a reception unit, a reservation unit, a first determination unit, and a second determination unit. The reception unit may receive a program of a first television broadcast which forms a majority of first runs of programs of all channels, a program of a second television broadcast which periodically broadcasts reruns, and electronic program information of the first and second television broadcasts. The reservation unit may execute a reserve-recording process of recording the programs based on each type of the electronic program information which has been received. The first determination unit may determine whether or not the reservation unit reserve-records a reservation candidate program as a candidate of a program to be reserve-recorded by the reservation unit corresponding to a plurality of broadcast patterns of a program of the first television broadcast in a predetermined time period. The second determination unit may determine whether or not the reservation unit reserve-records the reservation candidate program depending on whether or not a program to be compared with the reservation candidate program was recorded in past based on a reference time zone in which the reservation candidate program of the second television broadcast is broadcast.

In the second television broadcast that periodically broadcasts reruns, there may be many reruns. In the second television broadcast, when a program is received, the necessity of distinguishing first runs from reruns may be low. Thus, in this embodiment, when a program of the second television broadcast is received, if the program to be compared with the reservation candidate program has been already recorded, a simple algorithm of which such a reservation candidate program may not be reserve-recorded can be applied. Thus, the broadcast program reservation apparatus of this embodiment may be applied to every broadcast wave.

Under the current circumstance, "second television broadcast" is for example CS (Communications Satellite) digital broadcast. As the number of CS-like television broadcasts increases, they may be included in the "second television broadcast". Under the current circumstance, "first television broadcast" may include ground analog broadcast, ground digital broadcast, BS (Broadcasting Satellite) analog broadcast, and BS digital broadcast.

"Reception unit" may include a concept of for example two tuners that can receive both the first and second television broadcasts. However, the broadcast program reservation apparatus may not be provided with two tuners. For example, another apparatus different from the broadcast program reservation apparatus may receive the second television broadcast, whereas the broadcast program reservation apparatus may receive video and audio signals of the second television broadcast from the other apparatus.

According to an embodiment of the present invention, there is provided a broadcast program reservation apparatus which may include a reception unit, a reservation unit, a series broadcast determination unit, and a series broadcast determination unit. The reception unit may receive a broadcast program and electronic program information. The reservation unit may execute a reserve-recording process of recording the program based on the electronic program information which has been received. The series broadcast determination unit may determine whether or not a reservation candidate program as a candidate of a program reserve-recorded by the reservation unit and a program to be compared with the reservation candidate program are broadcast in series at a predetermined time interval in a reference date on which the reservation candidate program is broadcast. The control unit may cause the reservation unit to reserve-record the reservation candidate program when a determined result of the series broadcast determination unit denotes that the reservation candidate program and the program to be compared are broadcast in series at the predetermined time interval in the reference date.

According to an embodiment of the present invention, there is provided a broadcast program reservation apparatus which may include a reception unit, a reservation unit, a record determination unit, and a control unit. The reception unit may receive a broadcast program and electronic program information. The reservation unit may execute a reserve-recording process of recording the program based on the electronic program information which has been received. The record determination unit may determine whether or not a program to be compared with a reservation candidate program as a candidate of a program reserve-recorded by the reservation unit was perfectly recorded in past. The control unit may control the reservation unit to reserve-record the reservation candidate program when the program to be compared was not perfectly recorded in past.

According to an embodiment of the present invention, there is provided a broadcast program reservation apparatus which may include a reception unit, a reservation unit, a start time determination unit, and a control unit. The reception unit may receive a broadcast program and electronic program information. The reservation unit may execute a reserve-recording process of recording the program based on the electronic program information which has been received. The start time determination unit may determine whether or not a difference between a start time of the reservation candidate program and a start time of a program to be compared with the reservation candidate program is within a predetermined time. The control unit may cause the reservation candidate program to be reserve-recorded when the difference between the start times is within the predetermined time.

According to an embodiment of the present invention, there is provided a broadcast program reservation apparatus which may include a reception unit, a reservation unit, and a priority level assignment unit. The reception unit may receive a broadcast program and electronic program information. The reservation unit may execute a reserve-recording process for recording the program based on the electronic program information which has been received. The priority level assignment unit may assign a priority level based on which the reservation unit executes the reserve-recording process to each of a plurality of broadcast time zones of the reference date on which the reservation candidate program is broadcast. The priority level determination unit may compare a broadcast time zone of the reservation candidate program with a broadcast time zone of the program to be compared with the reservation candidate program and determine whether or not the reservation candidate program is caused to be reserve-recorded corresponding to a priority level which has been assigned.

According to an embodiment of the present invention, there is provided a broadcast program reservation method. A broadcast program and electronic program information may be received. It may be determined whether or not a reservation candidate program as a candidate of a program is caused to be reserve-recorded based on the electronic program information which has been received corresponding to a plurality of broadcast patterns of the program in a predetermined time period when the reservation candidate program to be reserve-recorded has been selected based on the electronic program information which has been received.

According to an embodiment of the present invention, there is provided a broadcast program reservation apparatus which may include a reception unit, a reservation unit, and a determination unit. The reception unit may receive a broadcast program and electronic program information. The reservation unit may execute a reserve-recording process of recording the program based on the electronic program information which has been received. The determination unit may determine whether or not a reservation candidate program as a candidate of a program reserve-recorded by the reservation unit is caused to be reserve-recorded corresponding to a plurality of broadcast patterns of the program in a predetermined time period.

According to embodiments of the present invention, the detection accuracy of whether or not a broadcast program is a rerun can be improved. As a result, first run programs and rerun programs may be prevented from being redundantly recorded.

These and other objects, features and advantages of the present invention will become more apparent in light of the following detailed description of a best mode embodiment thereof, as illustrated in the accompanying drawings.

BRIEF DESCRIPTION OF DRAWINGS

The invention will become more fully understood from the following detailed description, taken in conjunction with the accompanying drawings, wherein similar reference numerals represent similar elements, in which:

FIG. 9 is a decision table that designates whether or not a reservation process unit executes a reserve-recoding process in combinations of "future detection patterns 1 to 4" as a future broadcast pattern group and "past detection patterns 1 to 3" as a past broadcast pattern group;

FIG. 11A is a table showing the case that programs that belong to a program group whose program information is similar and that have different contents are broadcast in series in a midnight time zone of one day;

FIG. 11B is a table showing the case that programs that belong to a program group whose program information is similar and that have the same contents are broadcast a plurality of times in one day;

FIG. 12A is a schematic diagram showing a concept of an example of which a program having high similarity was imperfectly recorded;

FIG. 12B is a schematic diagram showing a concept of an example of which a program having high similarity was perfectly recorded;

FIG. 13 is a schematic diagram showing a concept of a broadcast pattern describing a start time match determination process;

FIG. 14 is a table showing an example of programs that are broadcast as first runs on daily basis and whose broadcast start times are nearly the same;

FIG. 15 is a schematic diagram showing a concept describing a priority level determination process;

FIG. 16 is a flow chart showing a reserve-recording operation that is executed depending on an attribute of a reservation candidate program;

FIG. 18A is a schematic diagram showing the case that a program having high similarity was recorded n days before a reference date;

FIG. 18B is a schematic diagram showing the case that a program having high similarity was not recorded in the past;

FIG. 19 is a decision table that designates whether or not a program is caused to be reserve-recorded;

DETAILED DESCRIPTION

Next, with reference to the accompanying drawings, embodiments of the present invention will be described.

Figure 1:
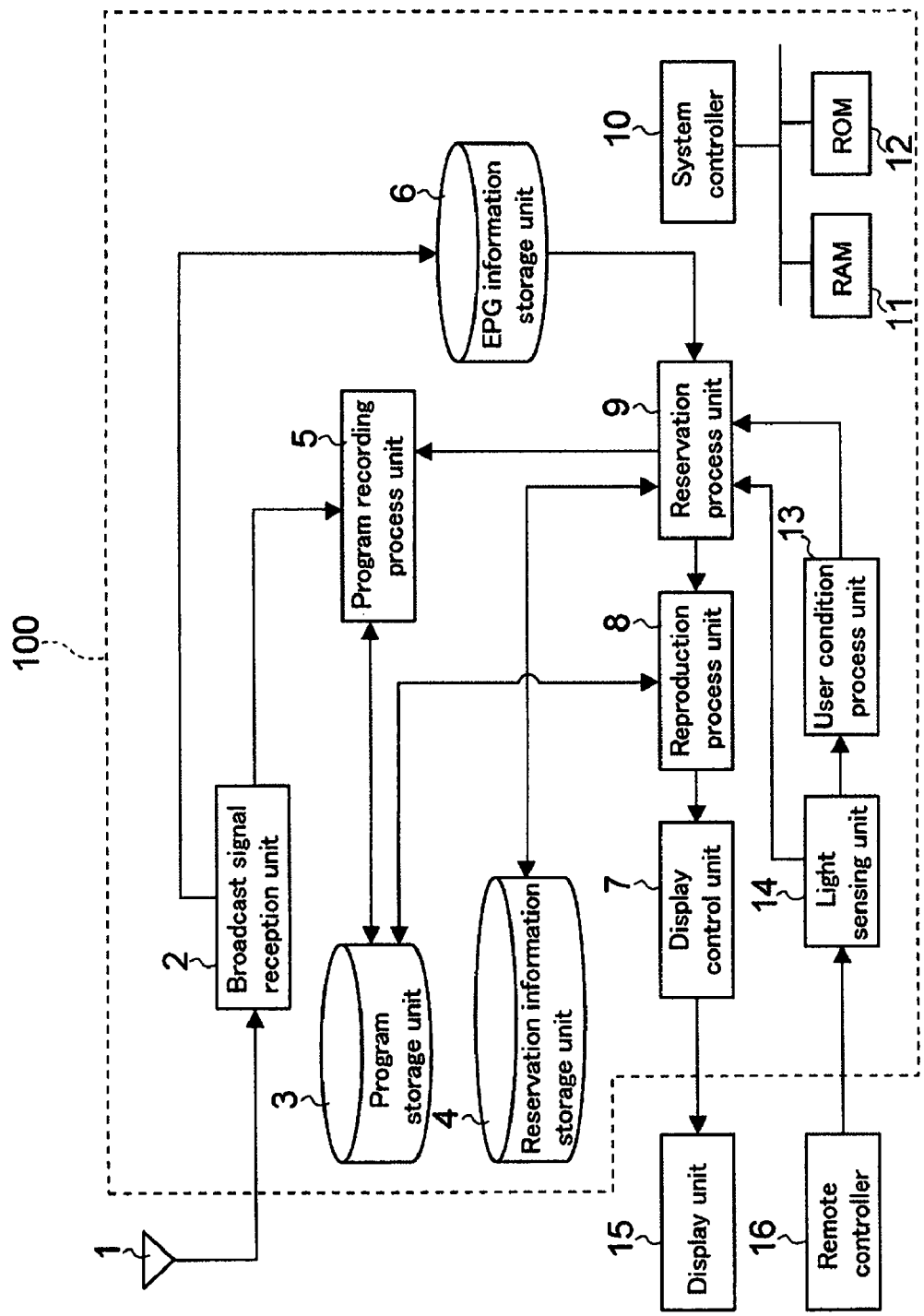
FIG. 1 is a block diagram showing a structure of a broadcast program reservation apparatus according to an embodiment of the present invention.

FIG. 1 is a block diagram showing a structure of a broadcast program reservation apparatus according to an embodiment of the present invention. Reference numeral 100 represents the broadcast program reservation apparatus of this embodiment. The broadcast program reservation apparatus 100 includes a system controller 10, a broadcast signal reception unit 2, a program recording process unit 5, a reserve-recording process unit 9, a reproduction process unit 8, a display control unit 7, a user condition process unit 13, a light sensing unit 14, a program storage unit 3, a reservation information storage unit 4, and an EPG information (electronic program information) storage unit 6.

The system controller 10 controls each block of the broadcast program reservation apparatus 100. To control each block of the broadcast program reservation apparatus 100, when necessary, the system controller 10 accesses a ROM (Read Only Memory) 12 and a RAM (Random Access Memory) 11 through a host bus.

The broadcast signal reception unit 2 receives a television broadcast signal from an antenna 1. The broadcast signal reception unit 2 has an analog tuner and a digital tuner (not shown) and receives a program of each channel through the analog tuner and the digital tuner. Television broadcasts include ground analog broadcast, ground digital broadcast, BS analog broadcast, BS digital broadcast, cable broadcast, and satellite broadcast.

The program recording process unit 5 performs various types of processes that record a program received by the broadcast signal reception unit 2 to the program storage unit 3 under the control of the system controller 10. The program recording process unit 5 separates for example an analog broadcast signal into a video signal and an audio signal.

Specifically, when the received broadcast wave is an analog broadcast, a video signal is decoded by an NTSC (National Television System Committee) decoder (not shown) and encoded according to for example the MPEG (Moving picture Experts Group) system. As a result, a video ES (Elementary Stream) is generated. On the other hand, an audio signal is converted from an analog signal into a digital signal and encoded according to for example the MPEG system. As a result, an audio ES is generated. A multiplexing circuit (not shown) multiplexes the encoded video data and audio data. As a result, a TS (Transport Stream) is generated and stored in the program storage unit 3.

On the other hand, when the received broadcast wave is a digital broadcast, the program recording process unit 5 stores a TS transmitted from a broadcasting station directly in the program storage unit 3. Instead, the program recording process unit 5 may re-encode a received TS according to the MPEG system to convert the TS into a PS (Program Stream) used in for example the DVD (Digital Versatile Disc) format and stores the PS in the program storage unit 3.

The program recording process unit 5 also has a buffer for data streams such as a TS and a PS, a control circuit that controls the buffer, and so forth.

The encode system and the decode system (that will be described later) are not limited to the MPEG system. As the encode system and the decode system, of course, other codecs may be used.

The reservation process unit 9 references EPG information stored in the EPG information storage unit 6 and executes a reserve-recording process that the program recording process unit 5 performs to record a program under the control of the system controller 10.

The program storage unit 3 stores data of the program processed by the program recording process unit 5 (that will be described later) under the control of the system controller 10. The EPG information storage unit 6 stores EPG information periodically obtained through the broadcast signal reception unit 2 under the control of the system controller 10. In this case, the system controller 10 regularly updates the EPG information and stores the updated EPG information in the EPG information storage unit 6. The EPG information is transmitted from any or a particular broadcasting station periodically one time a day or several times a day. The broadcast program reservation apparatus 100 receives the EPG information from such a broadcasting station.

The EPG information is normally transmitted together with a program broadcast wave. Instead, the EPG information may be transmitted for example through the Internet. The broadcast program reservation apparatus 100 may receive the EPG information through the Internet. In this case, a reception unit for a video signal and an audio signal of a radio broadcast wave may be different in hardware structure from that of the EPG information. The reservation information storage unit 4 stores reservation information for a program reserved by the reservation process unit 9. Specifically, reservation information includes information about broadcast wave, channel, time zone, and program title of a reserved program. Sometimes, reservation information may include keyword designated by the user.

EPG information and a television broadcast may not be provided by the same medium. Instead, they may be provided by different mediums such that a television broadcast is provided as a radio wave broadcast and EPG information is transmitted through the Internet.

The program storage unit 3, the EPG information storage unit 6, and the reservation information storage unit 4 use a magnetic disc such as a hard disk or a record medium such as an optical disc. Instead, they may use a semiconductor memory, a dielectric memory or a tape-shaped record medium. The optical disc includes DVD and BD (Blu-ray Disc®). The optical disc includes any type of an optical disc that allows a signal to be optically recorded or reproduced such as CD (Compact Disc), an optical disc using proximity light, an optical disc using hologram, and a magneto-optical disc. At least one of the program storage unit 3, the EPG information storage unit 6, and the reservation information storage unit 4 may be an apparatus that is different from the broadcast program reservation apparatus 100 and may be externally connected to the broadcast program reservation apparatus 100.

The reproduction process unit 8 outputs video and sound to a display unit 15 for example externally connected to the broadcast program reservation apparatus 100. Specifically, in the reproduction process unit 8, a separation circuit, an MPEG decoder, and so forth (not shown) extracts a video ES and an audio ES from the original TS under the control of the system controller 10. Instead, an apparatus of which the display unit 15 and the broadcast program reservation apparatus 100 are integrated may be accomplished.

The display control unit 7 converts a video ES and an audio ES that are output for example from the reproduction process unit 8 into analog signals and outputs the analog signals to the display unit 15. The display control unit 7 also has a function of an OSD (On Screen Display). The OSD performs a process that generates graphics and superimposes the generated graphics with video data or partly displays the generated graphics.

The light sensing unit 14 receives a signal from for example a remote controller 16 that the user operates, converts the signal into a digital signal, and outputs the digital signal to the user condition process unit 13.

The user condition process unit 13 performs processes corresponding to signals that are output from the light sensing unit 14 corresponding to various operations of the remote controller 16 under the control of the system controller 10. When the user condition process unit 13 has operation buttons and so forth with which the user directly operates the broadcast program reservation apparatus 100 together with the light sensing unit 14, the user condition process unit 13 also processes operation signals corresponding to the operation buttons.

Next, the operation of the broadcast program reservation apparatus structured as described above will be described.

Figure 2:
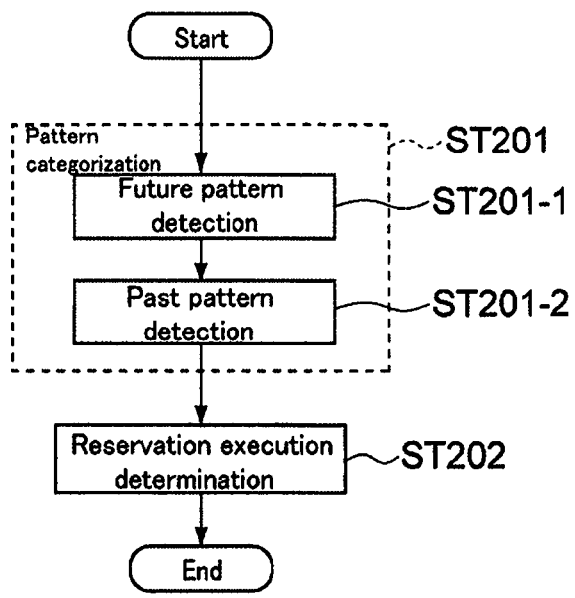
FIG. 2 is a flow chart showing an operation of the broadcast program reservation apparatus.

FIG. 2 is a flow chart showing the operation of the broadcast program reservation apparatus. When the user performs an operation for the remote controller and the operation is a reserve-recording operation for a program, the system controller 10 categorizes a broadcast pattern (at step 201). When the user performs a reserve-recording operation for a program, the system controller 10 extracts EPG information from the EPG information storage unit 6 and displays the extracted EPG information on the display unit 15. The user operates the remote controller 16 while watching the EPG information. When the user presses for example a reserve-recording button, a signal corresponding to the operation is processed by the user condition process unit 13. As a result, the reservation process unit 9 executes a reserve-recording process of recording a designated program in the program storage unit 3.

In the categorizing process for the broadcast pattern at step 201, a broadcast pattern to which a program that the user is reserve-recording (hereinafter this program is referred to as a reservation candidate program) is decided from a plurality of broadcast patterns that will be described later. When the system controller 10 has categorized the broadcast pattern, the system controller 10 performs a reserve-recording execution determination process of determining whether or not the reservation candidate program is caused to be reserve-recorded (at step 202).

At step 201, the broadcast pattern categorization process, the system controller 10 references the EPG information and determines whether or not there is a program to be compared with the reservation candidate program in the future based on the time zone (hereinafter, this time zone is referred to as the reference time zone) in which the reservation candidate program will be broadcast (at step 201-1). In addition, the system controller 10 detects whether or not there is a program to be compared with the reservation candidate program in the past based on the reference time zone (at step 201-2). Step 201-1 and step 201-2 are interchangeable. Hereinafter, the detection in the future direction at step 201-1 is referred to as "future pattern detection", wherein the detection in the past direction is referred to as "past pattern detection".

Figure 3:
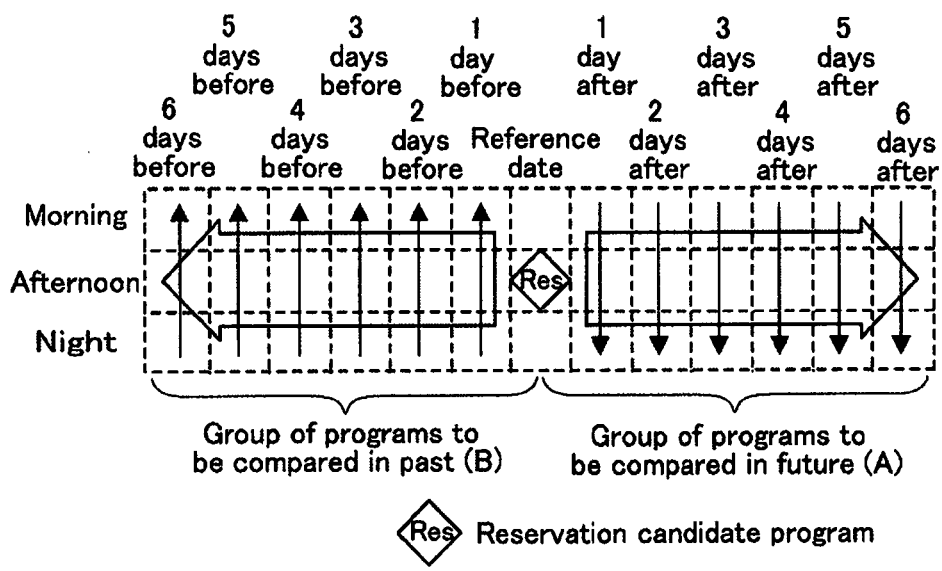
FIG. 3 is a schematic diagram showing an example of a concept of which a system controller determines whether or not there is a program to be compared based on a broadcast date of a reservation candidate program as a reference date.

FIG. 3 is a schematic diagram showing a concept of an example of which the system controller 10 determines whether or not there is a program to be compared based on the date on which the reservation candidate program is broadcast as a reference date. Specifically, this conceptual illustration corresponds to a conceptual illustration of EPG information. In this example, one day is segmented into "morning", "afternoon", and "night". "Morning" ranges from 5:00 to 12:00. "Afternoon" ranges from 12:00 to 19:00. "Night" ranges from 19:00 through 24:00 to 5:00 of the next day. In this case, the reference date represents one whole day from 5:00 of "morning" of the current day to 5:00 of "morning" of the next day.

However, the segmentations of time zone and day are not limited to such an example, but they may be changed when necessary. For example, "morning" may range from 5:00 to 11:00. "Afternoon" may range from 11:00 to 17:00. "Night" may range from 17:00 through 24:00 to 5:00 of the next day. For example, the reference date may be one whole day from 0:00 to 24:00. In FIG. 3, "res." represents a reservation candidate program. In this example, the reference time zone belongs to "afternoon".

One day is not simply segmented into "morning", "afternoon", and "night". Instead, the conceptual illustration corresponds to a concept of EPG information. Thus, the conceptual illustration may be segmented in the unit of an hour, a minute, or a program. In this example, for easy understanding, the conceptual illustration is segmented into "morning", "afternoon", and "night".

Figure 23A:
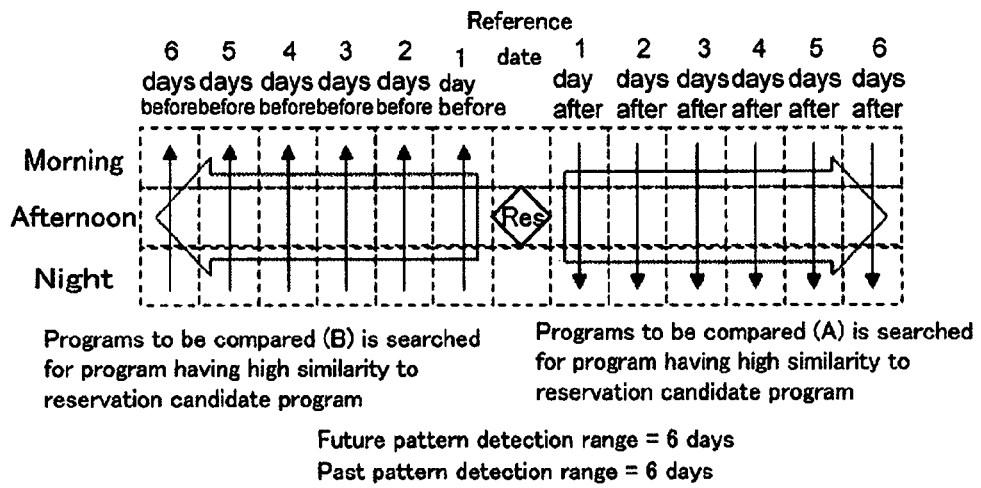
FIG. 23A and FIG. 23B are schematic diagrams showing a concept of an example of which designated detection periods have been changed.
Figure 23B:
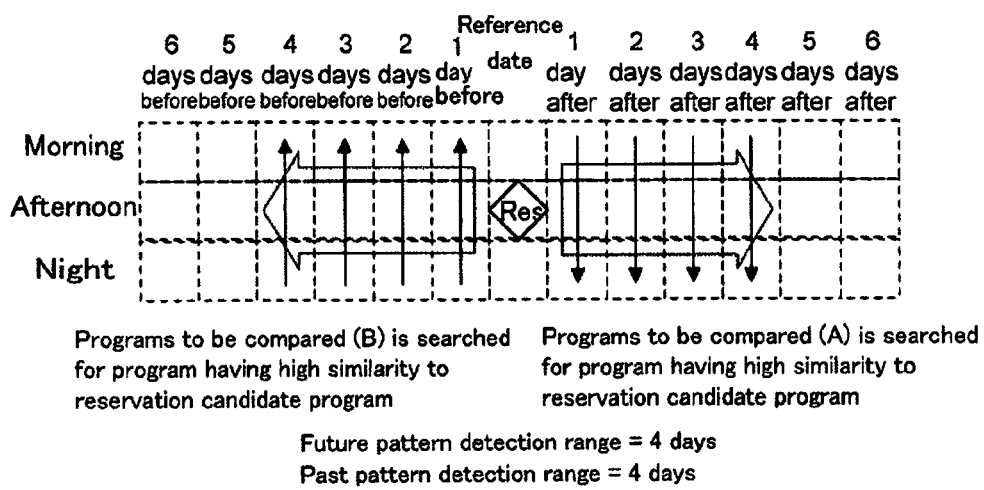

The conceptual illustration has a detection period of which it is detected whether or not there is a program to be compared for six days before and after the reference date. Instead, the detection period may be for three days to five days before and after the reference date or for seven days to one month before and after the reference date. The detection period can be designated by the user. For example, as shown in FIG. 23A, a program titled "Of course, you can laugh out", since this program is broadcast for five days in series from Monday to Friday, the detection period can be designated for example for five days before and after the reference date or as shown in the illustration every second week (for five days before and after the reference date). On the other hand, as shown in FIG. 23B, when a program titled "high school course on physics" is broadcast every fourth day or in series for four days, the detection period can be designated for four days before and after the reference date.

Figure 4:
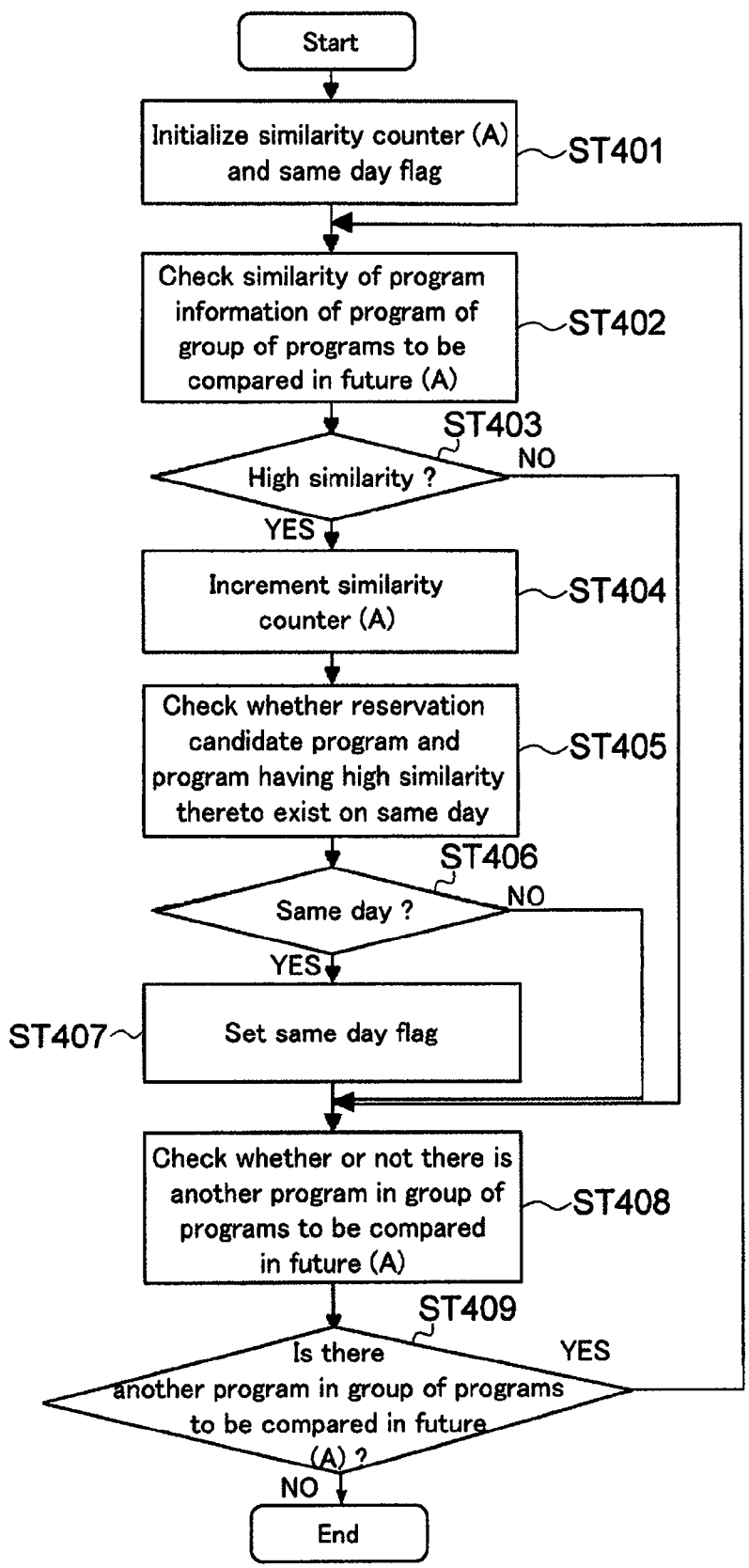
FIG. 4 is a flow chart showing an operation of "future pattern detection" at step 201-1 shown in FIG. 2.
Figure 5:
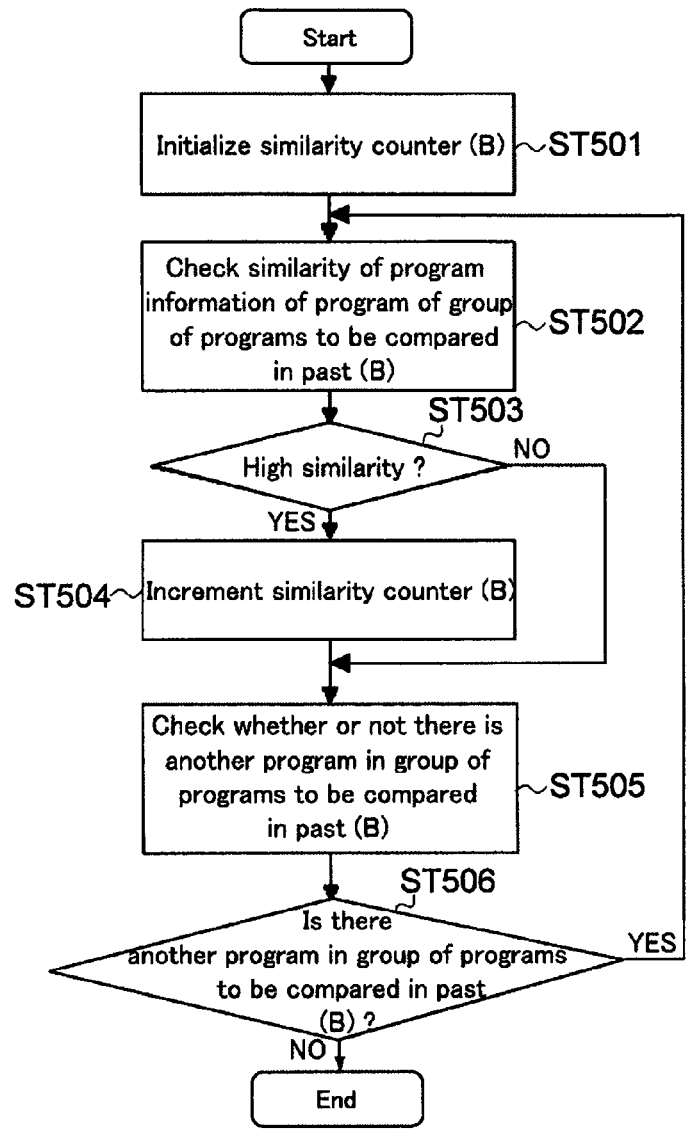
FIG. 5 is a flow chart showing an operation of "past pattern detection" at step 201-2 shown in FIG. 2.
Figure 6:
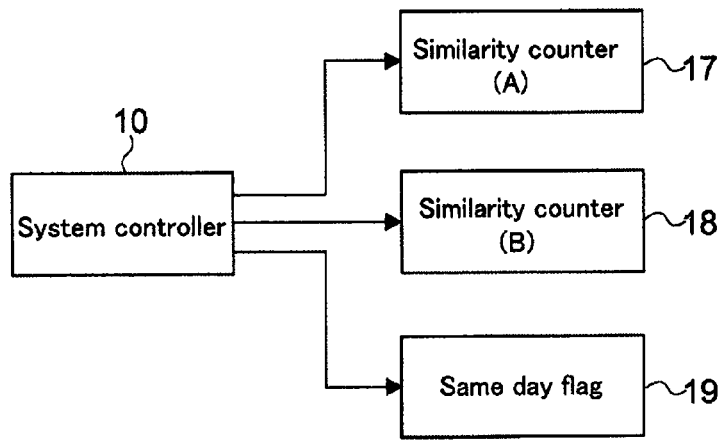
FIG. 6 is a block diagram describing these operations.

FIG. 4 is a flow chart showing the operation of "future pattern detection" at step 201-1. FIG. 5 is a flow chart showing the operation of "past pattern detection" at step 201-2. FIG. 6 is a block diagram describing these operations. In FIG. 6, a similarity counter (A) 17 is incremented by one whenever one program of a group of programs to be compared in the future (A) shown in FIG. 3 is detected. Likewise, a similarity counter (B) 18 is incremented by one whenever one program of a group of programs to be compared in the past (B) is detected. A same day flag 19 is set when there is a program to be compared on the reference date.

In the "future pattern detection" process shown in FIG. 4, the system controller 10 initializes the similarity counter (A) 17 of the group of programs to be compared in the future (A) and initializes the same day flag 19 (at step 401). Thereafter, the system controller 10 checks the similarity of program information of a program of the group of programs to be compared in the future (A) (at step 402).

"Similarity" is a similarity between a reservation candidate program and a program to be compared. The system controller 10 compares these programs with respect to at least one of their "title", "genre", "content description", "broadcast duration", and "identification information", which identifies the type and contents of each program, based on EPG to determine their similarity (whether their similarity is high or low). A concept that includes "title", "genre", "content description", "broadcast duration", and "identification information" is referred to as "program information". It should be noted that "program information" is not limited to the foregoing five factors.

When all the five factors of the program information of the reservation candidate program match those of a program to be compared, it may be determined that their similarity be high. Instead, when at least four of the five factors of the program information of the reservation candidate program match those of a program to be compared, it may be determined that their similarity be high. Instead, when at least three of the five factors of the program information of the reservation candidate program match those of a program to be compared, it may be determined that their similarity be high. Instead, when at least two of the five factors of the program information of the reservation candidate program match those of a program to be compared, it may be determined that their similarity be high. Instead, when at least one of the five factors of the program information of the reservation candidate program matches that of a program to be compared match, it may be determined that their similarity be high. With respect to "content description", since the character string of "content description" of the program information is relatively long, when a predetermined part, not all, of the character string of "content description" of the reservation candidate program matches that of a program to be compared, it may be determined that their similarity be high. With respect to "title" and "broadcast duration", even if one of them of the reservation candidate program matches that of a program to be compared, it may be difficult to determine that their similarity be high. Thus, it is necessary to use these factors together with another factor.

When the system controller 10 detects one program having high similarity from the group of programs to be compared in the future (A) (namely, YES at step 403), the similarity counter (A) 17 is incremented by one (at step 404). When the system controller 10 has not detected one program having high similarity from the group of programs to be compared in the future (A) (namely, NO at step 403), the system controller 10 determines whether or not there is a program in the group of programs to be compared in the future (A) (at step 408). When there is another program in the group of programs to be compared in the future (A) (namely, YES at step 409), the flow returns to step 402. When there is no program in the group of programs to be compared in the future (A) (namely, NO at step S409), the system controller 10 completes the future pattern detection process.

After step 404, the system controller 10 checks whether or not the reservation candidate program and a program having high similarity thereto exist on the same day (reference date) (at step 405). When they exist on the same day (namely, YES at step 406), the same day flag 19 is set (at step 407). When they do not exist on the same day (namely, NO at step 406), the flow advances to step 408. In the operation shown in FIG. 4, it is preferred that program information of the group of programs to be compared in the future (A) be sorted in the ascending order of broadcast times.

In the "past pattern detection" process shown in FIG. 5, the system controller 10 initializes the similarity counter (B) 18 (at step 501). Thereafter, the system controller 10 checks the similarity of program information of a program of the group of programs to be compared in the past (B) based on the past program recorded states of the broadcast program reservation apparatus 100 (at step 502). Specifically, when the reference time zone belongs to the current day on which the user is reserve-recording a program, it is necessary to reference only the past program recorded states. When the reference time zone belongs to a date after the next day of the current day, the reserve-record process is performed for the reservation candidate program as a temporarily measure. On the date on which the reservation candidate program is broadcast, the past program recorded states are referenced.

When the system controller 10 has detected one program having high similarity from the group of programs to be compared in the past (B) (namely, YES at step 503), the system controller 10 increments the similarity counter (B) 18 by one (at step 504). When the system controller 10 has not detected a program having high similarity from the group of programs to be compared in the past (B) (namely, NO at step 503), the system controller 10 determines whether or not there is another program in the group of programs to be compared in the past (B) (at step 505). When there is another program in the group of programs to be compared in the past (B) (namely, YES at step 506), the flow returns to step 502.

When there is no program in the group of programs to be compared in the past (B) (namely, NO at step 506), the system controller 10 completes the past pattern detection process. After step 504, the flow advances to step 505. At step 505, the system controller 10 determines whether or not there is another program in the group of programs to be compared in the past (B). In the operation shown in FIG. 5, it is preferred that the program information of programs in the group of programs to be compared in the past (B) be traced back based on the reference time zone.

In the past pattern detection process, the same day flag 19 is not used. Thus, programs to be compared that are broadcast before the reference time zone on the same day (reference date) are not detected. In other words, when programs to be compared are broadcast in a time zone earlier than the reference time zone on the reference date, as will be described later, after step 201, "pattern categorization process", they can be detected.

Figure 7A:
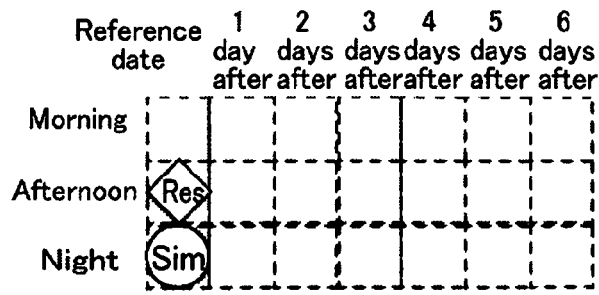
FIG. 7A, FIG. 7B, FIG. 7C, and FIG. 7D are schematic diagrams showing broadcast patterns of programs to be compared in the future pattern detection process at step 201-1 shown in FIG. 2.
Figure 7B:
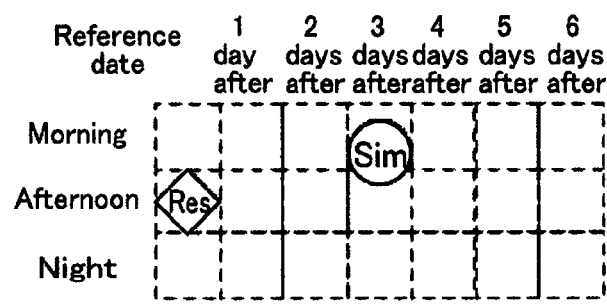
Figure 7C:
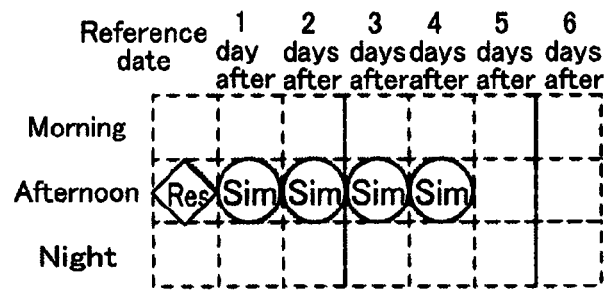

FIG. 7A to FIG. 7D are schematic diagrams showing broadcast patterns of programs to be compared (having high similarity) in the future pattern detection process at step 201-1. In this example, it is assumed that the reservation candidate program exists in "afternoon". In addition, it is assumed that the detection period is six days after the reference date. In FIG. 7A to FIG. 7C, "similar" represents a program having high similarity, namely a program to be compared.

FIG. 7A shows an example of which one program to be compared has been detected at "night" of the reference date, namely after the reference time zone. Hereinafter, this pattern is referred to as "future detection pattern 1".

FIG. 7B shows an example of which a program to be compared has been detected three days after the reference date. Hereinafter, this pattern is referred to as "future detection pattern 2".

FIG. 7C shows an example of which programs to be compared have been detected one or more days after the reference date for two or more days in series in the same time zone as the reference time zone. Hereinafter, this pattern is referred to as "future detection pattern 3". In this example, programs are broadcast in series for four days after the reference date. In this example, the reference date may be often be Monday and the day after four days of the reference date may be often Friday. However, the reference date may be other than Monday and the day after four days of the reference date may be other than Friday.

In the example shown in FIG. 7C, programs to be compared are broadcast in series after the reference date. Instead, programs to be compared may be detected in series for two or more days after two or more days of the reference date in the same time zone as the reference time zone. This pattern is also included in the future detection pattern 3. For example, a pattern of which the reference date is Saturday, the day after the reference date is Sunday, there is no program to be compared on Sunday, and programs to be compared are detected in series after Monday until Saturday is included in the future detection pattern 3.

Figure 7D:
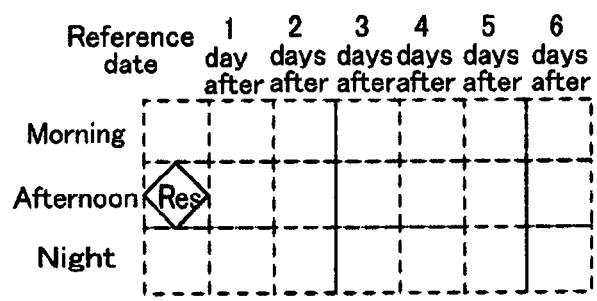

FIG. 7D shows an example of which a program to be compared has not been detected after the reference date. This pattern is referred to as "future detection pattern 4".

Figure 8A:
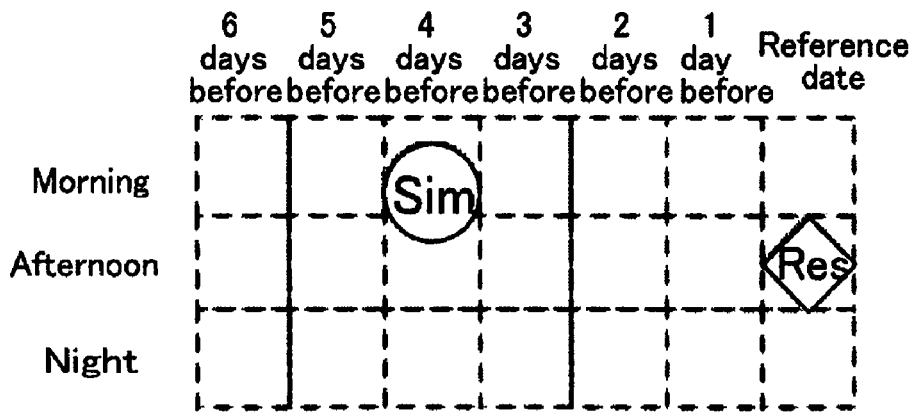
FIG. 8A, FIG. 8B, and FIG. 8C are schematic diagrams showing broadcast patterns of programs to be compared in the past pattern detection process at step 201-2 shown in FIG. 2.
Figure 8B:
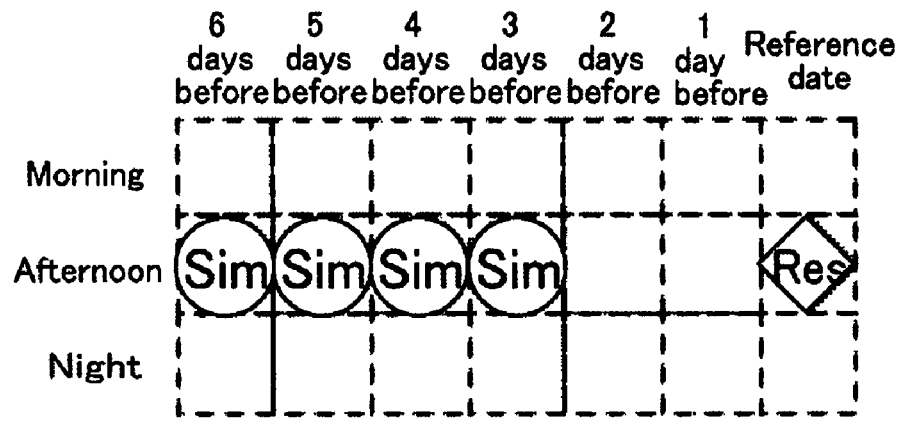
Figure 8C:
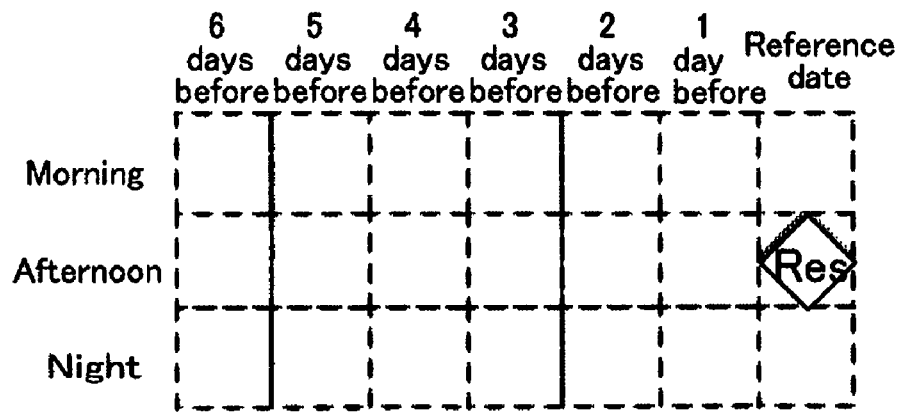

FIG. 8A to FIG. 8C are schematic diagrams showing broadcast patterns of programs to be compared (having high similarity) in the past pattern detection process at step 201-2. In this example, it is assumed that a reservation candidate program exists in "afternoon". In addition, it is assumed that the detection period is for six days before the reference date.

FIG. 8A shows an example of which one program to be compared has been detected four days before the reference date. Hereinafter, this pattern is referred to as "past detection pattern 1".

FIG. 8B shows an example of which programs to be compared have been detected three or more days before the reference date for two or more days in series in the same time zone as the reference time zone. Hereinafter, this pattern is referred to as "past detection pattern 2". In this example, programs are broadcast in series for four days after the reference date.

In this example, the reference date may be often Monday and the day before six days of the reference date may be often Monday. In the example shown in FIG. 8C, a program to be compared is detected three or more days before the reference date. Instead, a program to be compared may be detected one or more days before the reference date.

FIG. 8C shows an example of which a program to be compared has not been detected after the reference date. Hereinafter, this pattern is referred to as "past detection pattern 3".

As described above, in the past pattern detection process, the same day flag 19 is not used. In other words, a broadcast pattern corresponding to that shown in FIG. 7A is evaluated in the same manner as the past detection pattern 1.

FIG. 9 is a decision table denoting whether or not the reservation process unit 9 executes the reserve-recording process for programs corresponding to entries as combinations of "future detection patterns 1 to 4" as the future broadcast pattern group and "past detection patterns 1 to 3" as the past broadcast pattern group. In this table, "determined" denotes that a reservation candidate program of the current entry has been determined to be a first run and it has been determined that the reservation process unit 9 execute the reserve-recoding process for the reservation candidate program. In contrast, "not determined" denotes that since it is uncertain that a reservation candidate program for the current entry is a first run or a rerun at that point, it has not been determined whether or not the reservation process unit 9 executes the reserve-recording process for the reservation candidate program. As will be described later, when the reservation candidate program for the current entry is "not determined", since the program is either a first run or a rerun, the next determination process is executed.

In the case of future detection pattern 3, since the probability of which the reservation candidate program is a first run is high, entries for past detection patterns 1, 2, and 3 are "determined". In the case of past detection pattern 3, since the probability of which the reservation candidate program is a first run is high, entries for future detection patterns 1 to 4 are "determined".

When the past detection pattern is 2, it can be determined that the reservation candidate program be a first run in many cases. However, when the future detection pattern is 1, it is difficult to determine whether the reservation candidate program is a first run or a rerun. Specifically, even if programs to be compared were broadcast on daily basis in the past, when a program to be compared will be broadcast in the future, it is not certain whether the reservation candidate program is a first run or a rerun. Thus, the entry for past detection pattern 2 and future detection pattern 1 is "not determined".

Entries as combinations of detected broadcast patterns are designated as "determined" or "not determined", which denotes whether or not a program is reserve-recorded. The entries of the decision table shown in FIG. 9 may be pre-stored as a reference table in a ROM or the like. Instead, a logic circuit of the system controller 10 or the like may calculate an entry of the decision table when necessary.

Figure 10:
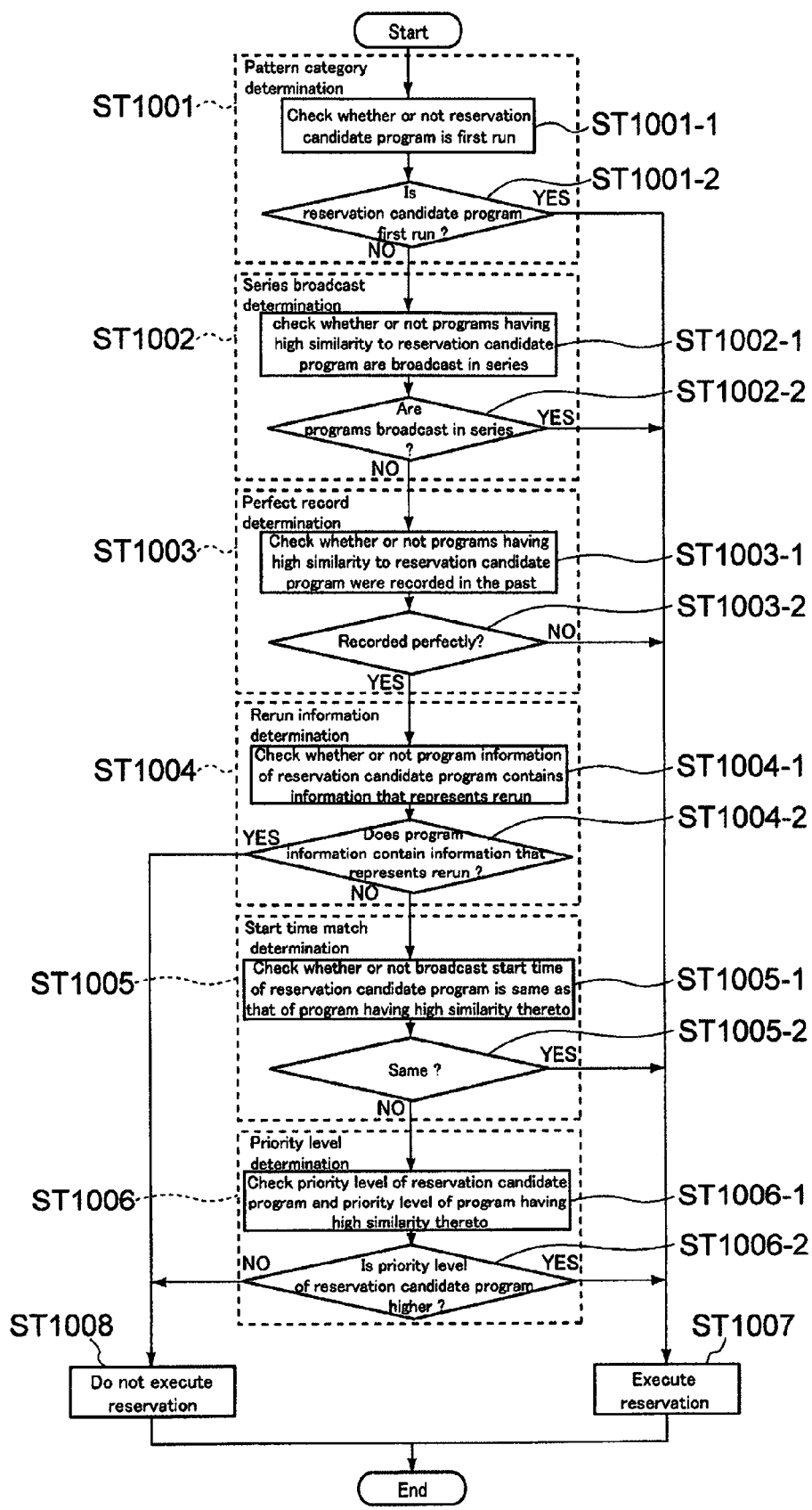
FIG. 10 is a flow chart showing details of a reserve-recording execution determination process at step 202 shown in FIG. 2.

FIG. 10 is a flow chart showing details of the reserve-recording execution determination process at step 202. At step 1001, the system controller 10 identifies one of the entries of the decision table and determines whether or not the reserve-recording process is caused to be executed corresponding to the identified entry.

Specifically, the system controller 10 checks whether the reservation candidate program is a first run or a rerun corresponding to the result of the pattern categorization process based on the decision table shown in FIG. 9 (at step 1001-1). When the reservation candidate program is a first run (namely, YES at step 1001-2), in other words, when the entry corresponding to the result of the pattern categorization process represents "determined", the reservation process unit executes the reserve-recording process for the reservation candidate program (at step 1007). In contrast, when the determined result does not denote that the reservation candidate program is a first run (namely, NO at step 1001-1), in other words, the entry corresponding to the result of the pattern categorization process represents "not determined", the system controller 10 does not execute the reserve-recording process for the reservation candidate program. Thereafter, the flow advances to step 1002.

Thus, since it is determined whether or not a program is caused to be reserve-recorded corresponding to a plurality of estimated broadcast patterns, the detection accuracy of whether the reservation candidate program is a first run or a rerun can be improved.

In particular, according to this embodiment, for a reservation candidate program, not only past broadcast patterns are detected, but also a plurality of future broadcast patterns are detected based on EPG information and the reservation candidate program is categorized based on the detected patterns. Thus, the detection accuracy of whether the reservation candidate program is a first run or a rerun can be improved.

Next, the series broadcast determination process will be described (at step 1002). Specifically, the system controller 10 checks whether or not the reservation candidate program and a program to be compared are broadcast in series (at step 1002-1). When the determined result denotes that they are broadcast in series (namely, YES at step 1002-2), the system controller 10 executes the reserve-recording process (at step 1007). When the determined result denotes that they are not broadcast in series (namely, NO at step 1002-2), the flow advances to step 1003.

In recent years, as shown in FIG. 11A, the situation of which programs that belong to a program group whose program information is similar are broadcast in series on one day mainly in the midnight time zone has arisen. For example, when a program is extended in the prime time zone (for example, from 19:00 to 23:00 or from 18:00 to 24:00), or a special program is broadcast, if a scheduled program is unable to be broadcast, since the number of stories of a program group may has been already decided or the last story of the program group may have been already decided, a plurality of stories of the program group, including a story that has not been broadcast, may be broadcast in series on the same day. These programs have features of which they are broadcast in series and the time interval therebetween is close. On the other hand, there is a case of which as shown in FIG. 11B, a program group whose program information has high similarity and whose contents are the same is broadcast several times a day.

To distinguish the case shown in FIG. 11A from the case shown in FIG. 11B, when there are a plurality of programs having high similarity to the reservation candidate program on the same day (reference date), the system controller 10 measures the time interval of these programs. When the time interval of the programs is a predetermined time interval or shorter that allows the system controller 10 can estimate that programs having different contents are broadcast in series, the system controller 10 determines that the reservation candidate program be a first run and executes the reserve-recording process for the reservation candidate program (at step 1007).

In this case, "predetermined time interval or shorter" includes five minutes or less, 10 minutes or less, 15 minutes or less, and 20 minutes or less. This time interval is designated taking into account of the cases of which a short news program, a shopping program, and other programs are broadcast.

When the series broadcast determination process is performed, since programs that are broadcast in series are reserve-recorded, first runs can be prevented from being not reserve-recorded.

Next, a perfect record determination process will be described. The perfect record determination process is performed at step 1003. The algorithm of the process after step 1003 assumes that a program to be compared was recorded in the past. In other words, the algorithm assumes that a program to be compared was recorded in the past detection pattern 1 or 2.

At step 1003, specifically, the system controller 10 checks whether or not a program having high similarity was perfectly recorded in the past (at step 1003-1). When a program having high similarity was perfectly recorded in the past (namely, YES at step 1003-2), the flow advances to step 1004. When a program having high similarity was not perfectly recorded in the past (namely, NO at step 1003-2), the system controller 10 executes the reserve-recording process for the reservation candidate program regardless of whether or not it is a rerun. FIG. 12A is a schematic diagram showing a concept of an example of which a program having high similarity was imperfectly recorded four days before the reference date. FIG. 12B is a schematic diagram showing a concept of which a program having high similarity was perfectly recorded four days before the reference date. In FIG. 12A, the imperfectly recorded state of a program having high similarity is represented by a dotted circle.

"Perfectly recorded" represents the case that a program to be compared was perfectly recorded from the beginning to the end. If a program to be compared was not perfectly recorded from the beginning to the end with desired picture quality and audio quality due to a poor transmission state of a program broadcast wave, abnormality of the broadcast program reservation apparatus 100 or the record medium, or the like, it is not said that the program was perfectly recorded.

Specifically, it can be determined whether or not a program was perfectly recorded by comparing the record duration of the program with the broadcast duration of the reservation candidate program in the EPG information. When they match fully or their time difference is a predetermined value or less, it can be decided that the program was perfectly recorded. The predetermined time difference is designated because the duration of a commercial message may vary in each program or the foregoing news program may be recorded for a few minutes along with the reservation candidate program.

Instead, a flag that denotes that a program was not perfectly recorded may be added as an attribute of a recorded program and the flag may be checked in a specific determination process.

In such a series broadcast determination process, if a program to be compared was not perfectly recorded last time, even if the reservation candidate program is a rerun, it can be recorded.

Next, a rerun information determination process will be described. The rerun information determination process is performed at step 1004. Specifically, only when a program was perfectly recorded in the past at step 1003, the system controller 10 checks whether or not program information of a reservation candidate program corresponding to the recorded program contains information that represents a rerun (at step 1004-1). When the program information does not contain information that represents a rerun (namely, NO at step 1004-2), the flow advances to step 1005. When the program information contains information that represents a rerun (namely, YES at step 1004-2), the system controller 10 determines that the reservation process be not performed for the reservation candidate program (at step 1008).

The information that represents a rerun is characters and symbols that represent a rerun including (rerun), <rerun>, [rerun], (re-rerun), <re-rerun>, and [re-rerun]. The information that represents a rerun may be contained in content description of a program as well its title. In digital broadcast, the information that represents a rerun is for example a rerun descriptor described in information about a reservation candidate program.

Next, a start time match determination process will be described. The start time match determination process is preformed at step 1005. Specifically, the system controller 10 checks whether or not the broadcast start time of a reservation candidate program is the same as the broadcast start time of a program having high similarity thereto (at step 1005-1). When they are the same (namely, YES at step 1005-2), the system controller 10 executes the reserve-recording process (at step 1007). When they are not the same (namely, NO at step 1005-2), the flow advances to step 1006. In this case, "same" includes the case that the start times change within a predetermined time period. This time period is designated taking into account of the cases of which the start times change because a short news program, a shopping program, or another program is broadcast.

In the pattern categorization determination process at step 1001, if there is no program having high similarity to the reservation candidate program in the group of programs to be compared in the future (A) and there is only one program having high similarity to the reservation candidate program in the group of programs to be compared in the past (B), namely if the future detection pattern is 2 and the past detection pattern is 3, the corresponding entry of the decision table represents "not determined".

For example, in the case that a program group is broadcast on week days, when its programs are recorded from Thursday (one day before the reference date) and there is no program having high similarity in the next week (because a special program group such as Olympic games or the program group ends on Friday), a program that will be broadcast on Friday is mistakenly determined as a rerun. FIG. 13 is a schematic diagram showing a concept of such a case. Although programs having high similarity are supposed to be broadcast in the future of the reference date as represented by dotted circles, FIG. 13 shows a concept of which other programs are broadcast as a special period. In addition, programs, represented by dotted circles, two or more days before the reference date were broadcast as programs having high similarity. Since the user did not designate a condition, they were not recorded.

Thus, programs that are broadcast on daily basis have a characteristics of which their broadcast start times are nearly the same as shown in FIG. 14. Thus, when the future detection pattern is 2, the past detection pattern is 3, and the flow passes through steps 1002 to 1004, the start time match determination process is performed (at step 1005). When the start times are the same, since it can be determined that the reservation candidate program be a first run, the reservation process is executed for the reservation candidate program (at step 1007).

In the foregoing example, when the future detection pattern is 2, the past detection pattern is 3, and the flow passes through steps 1002 to 1004, the start time match determination process is performed. Instead, when the future detection pattern is 2, the past detection pattern is 3, even if the flow does not pass through steps 1002 to 1004, the start time match determination process may be performed.

Next, a priority level determination process will be described. The priority level determination process is performed at step 1006. Specifically, the system controller 10 compares the priority level of the broadcast time zone of a reservation candidate program with the priority level of the broadcast time zone of a program having high similarity thereto and checks a program whose broadcast time zone has a higher priority level than the other (at step 1006-1). When the priority level of the broadcast time zone of the reservation candidate program is higher than that of the program having higher similarity (namely, YES at step 1006-2), the system controller 10 executes the reserve-recording process for the reservation candidate program (at step 1007). When the priority level of the broadcast time zone of the reservation candidate program is equal to or lower than that of the program having high similarity (namely, NO at step 1006-2), the system controller 10 does not execute the reserve-recording process for the reservation candidate program (at step 1008).

In the reserve-recording execution determination process from step 1001 to step 105, only a first run is reserve-recorded with high probability. However, the preceding broadcast (first run) may not be recorded because of overlapping with another reserve-recording or a poor transmission state. In this case, with reference to FIG. 15, after the preceding first run, for example, a rerun four days after the reference date may be recorded. In this case, in the preceding algorithm, the next rerun program (a similar program three days after the reference date) is mistakenly estimated as a first run. Thereafter, only reruns are reserve-recorded.

As long as reruns are continuously recorded, no problem may occur in many cases.

However, if another program is reserve-recorded in the time zone of the rerun or the rerun is not recorded due to any cause, neither a first run of the program nor a rerun thereof will be recorded. To prevent such a situation, the priority level determination process is performed.

The example shown in FIG. 15 corresponds to the case of which the future detection pattern is 2 and the past detection pattern is 1. In this case, at step 1001, the entry corresponding to these patterns represents "not determined". It is assumed that a first run of a program was not recorded four days before the reference date due to the foregoing reason and a rerun of the program was recorded four days before the reference date. In this case, the flow advances from step 1002 to step 1003. When the rerun was perfectly recorded, the flow advances to step 1004. When there is no information that represents a rerun at step 1004, the flow advances to step 1005. In FIG. 15, the start time of the reservation candidate program is different from that of the similar program that exists four days before the reservation candidate program. In this case, at step 1006, the priority level of the broadcast time zone of the reservation candidate program is compared with that of the similar program.

In this case, for example, as the priority levels, the golden time of "night" can be assigned the highest priority level. "Afternoon" can be assigned the next highest priority level. The broadcast time zone including "morning" and the time zone of which the golden time is excluded from "night" can be assigned the lowest priority level. When the priority levels are assigned in such a manner, in FIG. 15, since the priority level of the broadcast time zone of the reservation candidate program is higher than that of the broadcast time zone of the program that exists four days before the reference date, the reservation candidate program is considered as a first run and it is reserve-recorded.

The priority levels may be assigned by the user, not corresponding to the foregoing algorithm. Instead, the user may input information that correlates first runs of programs and their time zones as priority levels to the broadcast program reservation apparatus 100. Thereafter, the designated priority levels corresponding to the stored information stored in the broadcast program reservation apparatus 100 may be applied.

Thus, in the reserve-recording execution determination process from step 1001 to 1008, it can be correctly determined whether or not a program is a first run or a rerun.

Next, a process of a broadcast program reservation apparatus 100 according to another embodiment of the present invention will be described.

There are programs to be recorded every time. These programs include live broadcast programs such as news programs and sports programs. In this example, "live broadcast" includes a broadcast mode of which before a live broadcast program that is being broadcast is completed, another program is broadcast from the broadcasting station.

In this embodiment, such a live broadcast program is assigned one attribute and the broadcast program reservation apparatus 100 recognizes this attribute. The broadcast program reservation apparatus 100 recognizes the attribute as for example genre information of EPG information, including for example "dramas", "animation", "movies", "varieties", "news", and "sports". These genres are assigned "determined" or "not determined" as shown in FIG. 9. Among these genres, "news" and "sports" are assigned "determined" for which the reserve-recording process is executed. Instead, when information of the program title or program content description of EPG information contains characters "news" or a character string or a symbol that identifies a live broadcast, the broadcast program reservation apparatus 100 can identify this broadcast.

Even if such live broadcast program that has high similarity to a reservation candidate program exists in the group of programs to be compared in the future (A) and the group of programs to be compared in the past (B), it is necessary to perform the reserve-recording process for the live broadcast program, regardless of whether the program has high or low similarity. FIG. 16 is a flow chart showing an example of this operation. First of all, the system controller 10 checks the attribute of the reservation candidate program (at step 1601). Thereafter, the system controller 10 determines whether or not the reservation candidate program is a program to be recorded every time (at step 1602). Specifically, when the reservation candidate program is a program to be recorded every time (namely, YES at step 1602), the system controller 10 executes the reserve-recording process (at step 1603). Otherwise (namely, NO at step 1602), the system controller 10 starts the operation shown in FIG. 10. Thus, a live broadcast program can be prevented from not being reserve-recorded.

Figure 17:
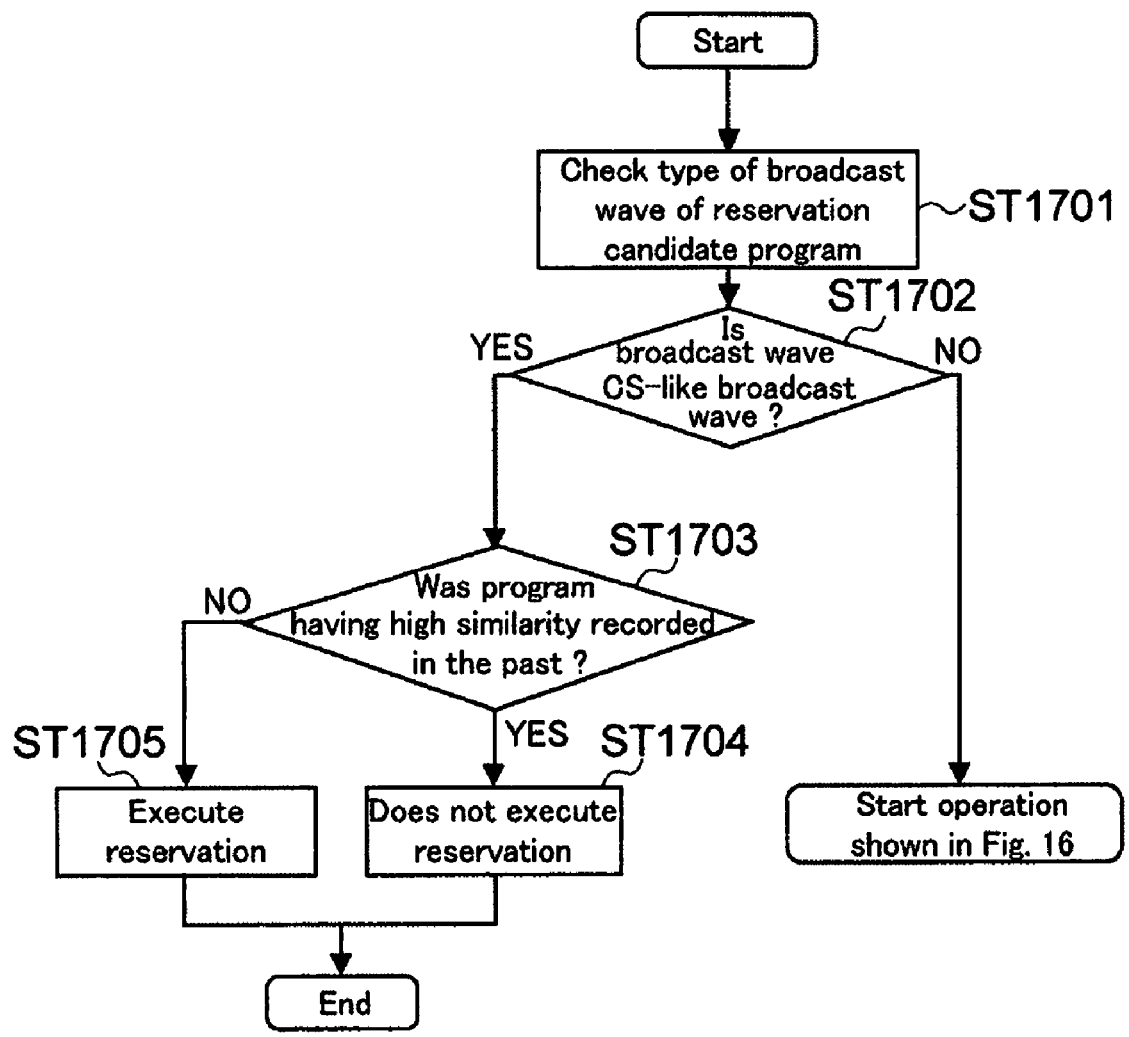
FIG. 17 is a flow chart showing a reserve-recording operation that is executed depending on whether the current broadcast wave is a CS-like broadcast wave.

FIG. 17 is a flow chart showing an operation according to another embodiment of the present invention. In this example, a system controller 10 checks the type of a broadcast wave of a reservation candidate program (at step 1701). Broadcast waves are for example a ground broadcast wave, a BS broadcast wave, and a CS broadcast wave. In a ground broadcast wave, first runs are mainly broadcast and reruns are not mainly broadcast. In a ground wave broadcast and a BS broadcast, first runs form a majority of programs of all channels. However, in a CS broadcast of which reruns of same programs are periodically and repeatedly broadcast, it is necessary to perform a special operation. Hereinafter, such a broadcast wave is referred to as a CS-like broadcast wave.

After step 1701, when the received broadcast wave is a CS-like broadcast wave (namely, YES at step 1702), the system controller 10 references past recorded states of programs similar to the reservation candidate program and checks whether or not a program having high similarity to the reservation candidate program was recorded in the past (at step 1703). When a program having high similarity to the reservation candidate program was recorded in the past, the system controller 10 does not reserve-record the program. Otherwise, the system controller 10 executes the reserve-recording process for the program (at step 1705). FIG. 18A and FIG. 18B are schematic diagrams showing a concept in such a process. FIG. 18A shows the case that a program having high similarity was recorded n days before the reference date. FIG. 18B shows the case that a program having high similarity was not recorded in the past. Assuming that the pattern shown in FIG. 18A is referred to as pattern (A) and the pattern shown in FIG. 18B is referred to as pattern (B), the reserve-recording process can be executed based on a decision table shown in FIG. 19.

When the received broadcast wave is not a CS-like broadcast wave at step 1702, the operation shown in FIG. 16 is performed.

As described above, in a CS-like broadcast that periodically broadcasts reruns, there may be many reruns. When a CS-like broadcast program is received, it is not highly necessary to distinguish a first run from a rerun. Thus, when a CS-like broadcast program is received, a simple algorithm of which if a program to be compared with a reservation candidate program was recorded in the past, the reservation candidate program is not reserve-recorded may be used. Thus, the broadcast program reservation apparatus of this embodiment can be applied to all types of broadcast waves.

Next, a broadcast program reservation apparatus according to another embodiment of the present invention will be described.

Figure 20:
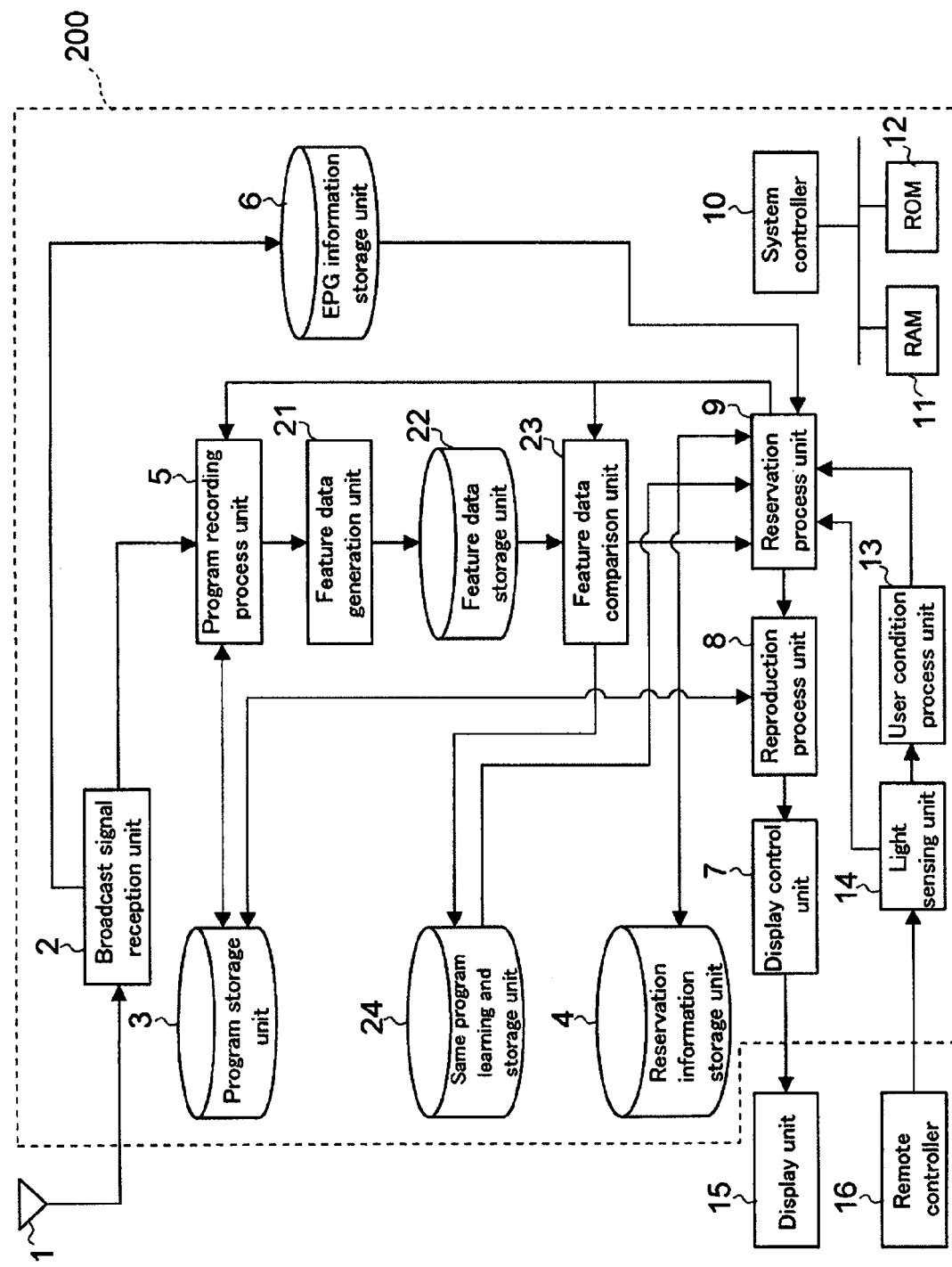
FIG. 20 is a block diagram showing an example of a broadcast program reservation apparatus according to another embodiment of the present invention.

FIG. 20 is a block diagram showing an example of a structure of the broadcast program reservation apparatus. In FIG. 20, reference numeral 200 represents the broadcast program reservation apparatus. In the following description, functions similar to the broadcast program reservation apparatus 100 according to the embodiment shown in FIG. 1 will be simply described or omitted. Their different points will be mainly described.

In the broadcast program reservation apparatus 100, a program having program information similar to that of a reservation candidate program is processed on the assumption that the possibility of which their contents are the same is high. However, when the provider of EPG information of the reservation candidate program and the provider of EPG information of the program similar thereto are different, although the contents of the programs are the same, the similarity of their program information may be low. In the case that program information of ground wave analog is G-Guide and program information of ground wave digital is ARIB, their program information may not be similar. Specifically, in recent years, NHK's period dramas have been broadcast with both ground digital broadcast and BS digital broadcast. To solve such a problem, the broadcast program reservation apparatus 200 shown in FIG. 20 is considered.

The broadcast program reservation apparatus 200 shown in FIG. 20 also includes a feature data generation unit 21, a feature data storage unit 22, a feature data comparison unit 23, and a same program learning and storage unit 24.

The feature data generation unit 21 generates feature data of the contents of a program recorded by the program recording process unit 5. Feature data are generated for example by extracting part or all of a luminance signal and/or part or all of a color signal from a reproduced video of the program. Instead, variations of the luminance signal and/or color signal and/or timings at which they vary may be extracted. When feature data are a sound, a sound pressure level of each frequency band may be extracted. Variation of the sound pressure level or timings at which the sound voltage level varies may be extracted. Instead, all or part of a data sequence of a reproduced video may be extracted. Instead, all or part of a data sequence of a reproduced sound may be extracted.

The feature data storage unit 22 stores feature data extracted and generated by the feature data generation unit 21. Specifically, the feature data storage unit 22 correlatively stores one recorded program and feature data thereof.

The feature data comparison unit 23 compares entries of feature data stored in the feature data storage unit 22.

Figure 21:
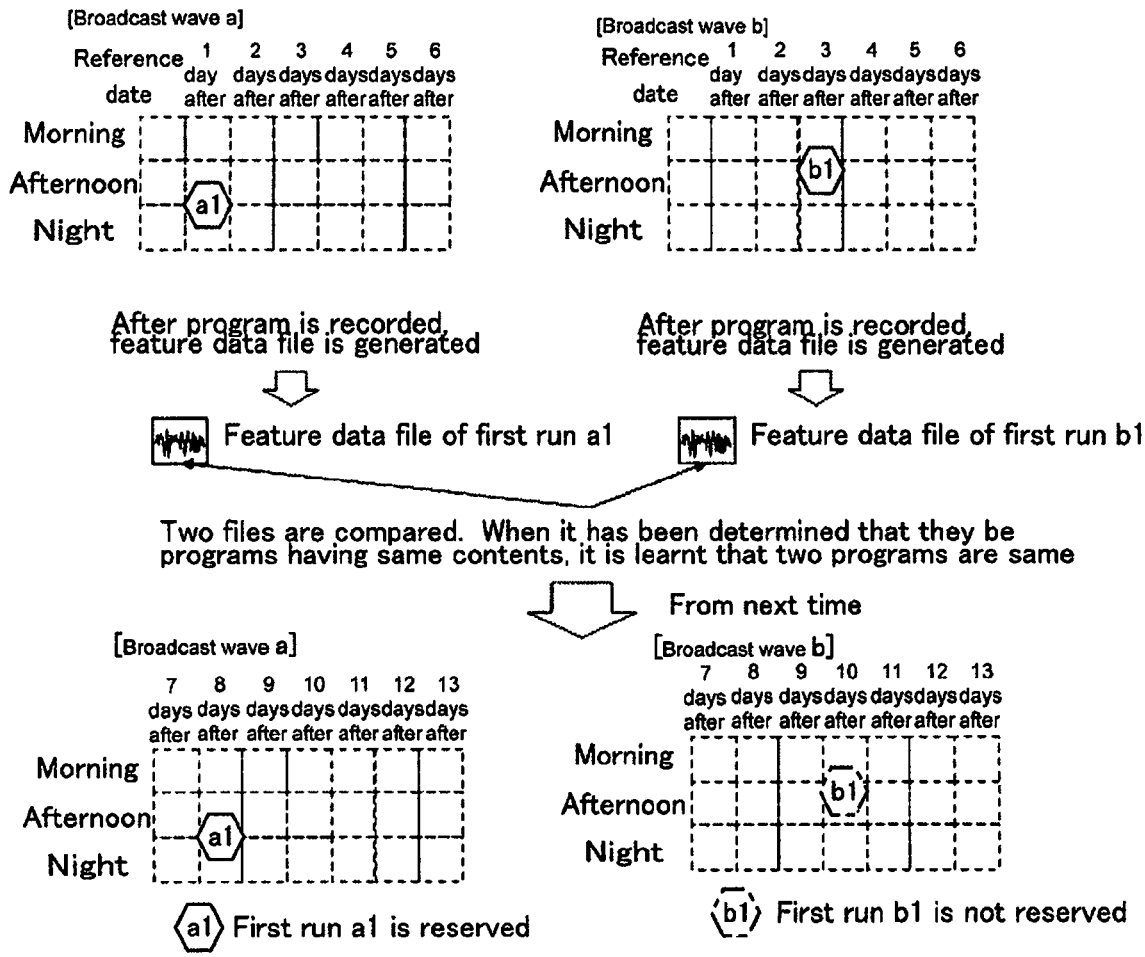
FIG. 21 is a schematic diagram showing a concept describing an example of which programs having the same contents that are broadcast with different broadcast waves are prevented from being redundantly recorded.

In FIG. 21, it is assumed that there are broadcast wave a and broadcast wave b and that first run a1 of broadcast wave a is scheduled to be broadcast one day after a reference date. In addition, it is assumed that first run b1 of broadcast wave b is scheduled to be broadcast on a date different from the scheduled broadcast date of first run a1 (three days after the reference date). In this case, the program recording process unit 5 of the broadcast program reservation apparatus 200 records both first runs a1 and b1. Thus, the feature data generation unit 21 generates a feature data file (as a file of feature data) of first run a1 and a feature data file of first run b1.

The feature data comparison unit 23 compares the feature data files of first runs a1 and b1. When the feature data comparison unit 23 has determined that their contents be the same, the feature data comparison unit 23 learns that they are the same programs. In addition, the same program learning and storage unit 24 stores information that denotes that the two programs have the same contents.

The feature data generation unit 21 may generate feature data files for all recorded programs. Instead, the feature data generation unit 21 may generate feature data files only for programs that the user designates.

It can be thought that the operation of the feature data comparison unit 23 is triggered by the user. Instead, the operation of the feature data comparison unit 23 may be triggered when the system controller 10 has referenced EPG information of broadcast waves a and b and has determined that "title" as a factor of program information of first run a1 match that of first run b1. Instead, the operation of the feature data comparison unit 23 may be triggered when the system controller 10 has determined that "content description" of first run a1 match that of first run b1 for a predetermined ratio. Instead, the system controller 10 may compare other factors of the program information. When two feature data files match, the system controller 10 may delete one of first runs a1 and b1.

Thus, the storage area of the program storage unit 3 can be prevented from being wasted. Instead, the system controller 10 may inform through the display unit 15 or the like the user that programs having the same contents have been recorded.

Returning to FIG. 21, after the same program learning and storage unit 24 stores the information that denotes that the two programs have the same contents, the system controller 10 operates as follows. When first run a1 of broadcast wave a exists eight days after the reference date and first run b1 of broadcast wave b exists 10 days after the reference date, the reservation process unit 9 reserve-records first run a1 whose start date is earlier than that of first run b1. In addition, the system controller 10 does not reserve-record first run b1 whose start date is later than that of first run a1. Instead, the system controller 10 may be able to reserve-record first run b1 whose start date is later than that of first run a1.

Thus, in this embodiment, programs having the same contents with a plurality of broadcast waves can be prevented from being redundantly recorded.

Next, another embodiment of the present invention will be described. As described above, in recent years, NHK's period dramas have been broadcast over two channels of BShi and BS2 of BS digital broadcast. The broadcast program reservation apparatuses 100 and 200 that have been described are not able to deal with the case of which first runs are broadcast over a plurality of channels.

Figure 22:
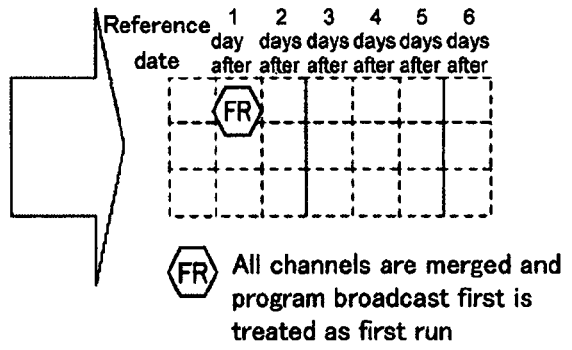
FIG. 22 is a schematic diagram describing an example of which programs having the same contents that are broadcast over different channels are prevented from being redundantly recorded.

To solve such a problem, a process as described in FIG. 22 is performed. FIG. 22 shows a concept in the case that first runs a1, a2, and a3 exist over channels x, y, and z in different times. By executing the processes shown in FIG. 10, FIG. 16, and FIG. 17 for each of channels x, y, and z, it can be determined that broadcasts a1, a2, and a3 be first runs. A system controller compares the broadcast start times of first runs a1, a2, and a3, selects one of them, and causes a reservation process unit 9 to execute a reserve-recording process for the selected first run. Thus, programs having the same contents can be prevented from being redundantly recorded. In the example shown in FIG. 22, the reserve-recording process is executed for first run a3, which is broadcast the first time.

It may be not necessary to record a program that is broadcast the first time. In other words, if first run a3 to be reserve-recorded overlaps with a different program to be reserve-recorded, the system controller 10 may be able to reserve-record first run a1 or a2.

Although the system controller 10 necessitates to select first runs a1, a2, and a3 as comparative objects, the system controller 10 can determine whether or not the contents of first runs a1, a2, and a3 are the same. In this case, it can be determined whether or not the contents of first runs a1, a2, and a3 are the same based on their program information.

Instead, the system controller 10 may select first runs a1, a2, and a3 as selective objects and determine whether or not the contents of first runs a1, a2, and a3 are the same based on an operation input by the user.

It should be understood by those skilled in the art that various modifications, combinations, sub-combinations and alternations may occur depending on design requirements and other factors insofar as they are within the scope of the appended claims or the equivalents thereof.

In the foregoing embodiments, as "broadcast", a regular television broadcast using a radio wave is exemplified. However, "broadcast" includes the case that programs are provided through a network such as the Internet. For example, IPTV can be thought as "broadcast". In addition, "broadcast" includes the case that programs are provided through cables. For example, cable televisions can be thought as "broadcast".

The invention claimed is:

1. A program reservation apparatus, comprising:
a reception unit which receives a program and electronic program information;
a reservation unit which executes a reserve-recording process of recording the program based on the electronic program information which has been received; and
a determination unit which determines whether or not a reservation candidate program as a candidate of the program reserve-recorded by the reservation unit is caused to be reserve-recorded corresponding to a plurality of patterns of the program in a predetermined time period,
the apparatus prevents redundant recording of the reservation candidate program by analyzing a past broadcast occurrence pattern and a future broadcast occurrence pattern of programs that are said to be similar to the reservation candidate program,
wherein when the apparatus automatically analyzes a past broadcast occurrence pattern, and automatically considers as past broadcast occurrences those programs that are said to be similar to the reservation candidate program and that are broadcast in a detected time zone earlier than a reference time zone for the reservation candidate program on a reference date for the reservation candidate program,
wherein a program is said to be similar to the reservation candidate program when there is a match between the program and the reservation candidate program for one or more of title, genre, content description, broadcast duration, and identification information.

2. The program reservation apparatus as set forth in claim 1,
wherein the determination unit determines whether or not the reservation candidate program is caused to be reserve-recorded corresponding to a past pattern of the program based on a reference time zone as a time zone in which the reservation candidate program is presented.

3. The program reservation apparatus as set forth in claim 1,
wherein the determination unit determines whether or not the reservation candidate program is caused to be reserve-recorded corresponding to a past pattern and a future pattern of the program based on a reference time zone as a time zone in which the reservation candidate program is presented.

4. The program reservation apparatus as set forth in claim 1, further comprising:
a series determination unit which determines whether or not the reservation candidate program and a program to be compared with the reservation candidate program are presented in series at a predetermined time interval in a reference date on which the reservation candidate program is presented,
wherein when the reservation candidate program and the program to be compared are presented in series at the predetermined time interval in the reference date, the reservation unit reserve-records the reservation candidate program.

5. The program reservation apparatus as set forth in claim 2, further comprising:
a record determination unit which determines whether or not a program to be compared with the reservation candidate program was perfectly recorded,
wherein when the program to be compared was not perfectly recorded, the reservation unit reserve-records the reservation candidate program.

6. A program reservation apparatus, comprising:
a reception unit which receives a program and electronic program information;
a reservation unit which executes a reserve-recording process of recording the program based on the electronic program information which has been received;
a determination unit which determines whether or not a reservation candidate program as a candidate of the program reserve-recorded by the reservation unit is caused to be reserve-recorded corresponding to a plurality of patterns of the program in a predetermined time period, wherein the determination unit determines whether or not the reservation candidate program is caused to be reserve-recorded corresponding to a past pattern of the program based on a reference time zone as a time zone in which the reservation candidate program is presented; and
a record determination unit which determines whether or not a program to be compared with the reservation candidate program was perfectly recorded, the record determination unit including a comparison unit which compares a record time at which the program to be compared was recorded with a time of the reservation candidate program in the electronic program information, and a decision unit which decides that the program to be compared was perfectly recorded when a compared result of the comparison unit denotes that a difference between the record time and the program time is within a predetermined time, and wherein when the program to be compared was not perfectly recorded, the reservation unit reserve-records the reservation candidate program,
the apparatus prevents redundant recording of the reservation candidate program by analyzing a past broadcast occurrence pattern and a future broadcast occurrence pattern of programs that are said to be similar to the reservation candidate program,
wherein when the apparatus automatically analyzes a past broadcast occurrence pattern, and automatically considers as past broadcast occurrences those programs that are said to be similar to the reservation candidate program and that are broadcast in a detected time zone earlier than a reference time zone for the reservation candidate program on a reference date for the reservation candidate program,
wherein a program is said to be similar to the reservation candidate program when there is a match between the program and the reservation candidate program for one or more of title, genre, content description, broadcast duration, and identification information.

7. The program reservation apparatus as set forth in claim 5, further comprising:
an identification information determination unit which determines whether or not the electronic program information contains identification information which denotes that the reservation candidate program is a second presentation when a determined result of the record determination unit denotes that the program to be compared was perfectly recorded,
wherein the reservation unit reserve-records the reservation candidate program when the electronic program information does not contain the identification information.

8. A program reservation apparatus, comprising:
a reception unit which receives a program and electronic program information;

a reservation unit which executes a reserve-recording process of recording the program based on the electronic program information which has been received;

a determination unit which determines whether or not a reservation candidate program as a candidate of the program reserve-recorded by the reservation unit is caused to be reserve-recorded corresponding to a plurality of patterns of the program in a predetermined time period, wherein the determination unit determines whether or not the reservation candidate program is caused to be reserve-recorded corresponding to a past pattern and a future pattern of the program based on a reference time zone as a time zone in which the reservation candidate program is presented; and a start time determination unit which determines whether or not a difference between a start time of the reservation candidate program and a start time of a program to be compared with the reservation candidate program is within a predetermined time, wherein the reservation unit reserve-records the reservation candidate program when the difference between the start times is within the predetermined time, the apparatus prevents redundant recording of the reservation candidate program by analyzing a past broadcast occurrence pattern and a future broadcast occurrence pattern of programs that are said to be similar to the reservation candidate program, wherein when the apparatus automatically analyzes a past broadcast occurrence pattern, and automatically considers as past broadcast occurrences those programs that are said to be similar to the reservation candidate program and that are broadcast in a detected time zone earlier than a reference time zone for the reservation candidate program on a reference date for the reservation candidate program, wherein a program is said to be similar to the reservation candidate program when there is a match between the program and the reservation candidate program for one or more of title, genre, content description, broadcast duration, and identification information.

9. The program reservation apparatus as set forth in claim 2, further comprising:

a priority level assignment unit which assigns a priority level based on which the reservation unit executes the reserve-recording process to each of a plurality of time zones of a reference date on which the reservation candidate program is presented; and a priority level determination unit which compares a time zone of the reservation candidate program with a time zone of a program to be compared with the reservation candidate program and determines whether or not the reservation candidate program is caused to be reserve-recorded corresponding to a priority level which has been assigned.

10. The program reservation apparatus as set forth in claim 1, further comprising:

an attribute assignment unit which assigns one of a plurality of attributes to the program; and an attribute determination unit which determines an attribute to which the reservation candidate program belongs in the attributes and determines whether or not the reservation candidate program is caused to be reserve-recorded corresponding to the attribute which has been determined.

11. The program reservation apparatus as set forth in claim 1, further comprising:

a feature data generation unit which generates feature data of the reservation candidate program and feature data of a program to be compared with the reservation candidate program, the reservation candidate program being a first television presentation, the program to be compared being a second television presentation, the first presentation being different from the second presentation; and a comparison and determination unit which compares the feature data of the reservation candidate program with the feature data of the program to be compared and determines whether or not to cause the reservation unit to reserve-record the reservation candidate program corresponding to a compared result of the comparison and determination unit.

12. The program reservation apparatus as set forth in claim 1, wherein the determination unit determines whether or not to the reservation candidate programs having high similarity is caused to be reserve-recorded for each of a plurality of different channels of one presentation, and wherein when there are two or more reservation candidate programs to be reserve-recorded, the reservation unit reserve-records only one of the reservation candidate programs.

13. A program reservation apparatus, comprising:

a reception unit which receives a program of a first television presentation which forms a majority of first runs of programs of all channels, a program of a second television presentation which periodically presents programs which have already been presented, and electronic program information of the first and second television presentations;

a reservation unit which executes a reserve-recording process of recording the programs based on each type of the electronic program information which has been received;

a first determination unit which determines whether or not the reservation unit reserve-records a reservation candidate program as a candidate of a program to be reserve-recorded by the reservation unit corresponding to a plurality of patterns of a program of the first television presentation in a predetermined time period; and a second determination unit which determines whether or not the reservation unit reserve-records the reservation candidate program depending on whether or not a program to be compared with the reservation candidate program was recorded in past based on a reference time zone in which the reservation candidate program of the second television presentation, the apparatus prevents redundant recording of the reservation candidate program by analyzing a past broadcast occurrence pattern and a future broadcast occurrence pattern of programs that are said to be similar to the reservation candidate program, wherein when the apparatus automatically analyzes a past broadcast occurrence pattern, and automatically considers as past broadcast occurrences those programs that are said to be similar to the reservation candidate program and that are broadcast in a detected time zone earlier than a reference time zone for the reservation candidate program on a reference date for the reservation candidate program, wherein a program is said to be similar to the reservation candidate program when there is a match between the program and the reservation candidate program for one or more of title, genre, content description, broadcast duration, and identification information.

14. A program reservation apparatus, comprising:
a reception unit which receives a program and electronic program information;
a reservation unit which executes a reserve-recording process of recording the program based on the electronic program information which has been received;
a series determination unit which determines whether or not a reservation candidate program as a candidate of a program reserve-recorded by the reservation unit and a program to be compared with the reservation candidate program are presented in series at a predetermined time interval in a reference date on which the reservation candidate program is presented; and
a control unit which causes the reservation unit to reserve-record the reservation candidate program when a determined result of the series determination unit denotes that the reservation candidate program and the program to be compared are presented in series at the predetermined time interval in a reference date,
the apparatus prevents redundant recording of the reservation candidate program by analyzing a past broadcast occurrence pattern and a future broadcast occurrence pattern of programs that are said to be similar to the reservation candidate program,
wherein when the apparatus automatically analyzes a past broadcast occurrence pattern, and automatically considers as past broadcast occurrences those programs that are said to be similar to the reservation candidate program and that are broadcast in a detected time zone earlier than a reference time zone for the reservation candidate program on a reference date for the reservation candidate program,
wherein a program is said to be similar to the reservation candidate program when there is a match between the program and the reservation candidate program for one or more of title, genre, content description, broadcast duration, and identification information.

15. A program reservation apparatus, comprising:
a reception unit which receives a program and electronic program information;
a reservation unit which executes a reserve-recording process of recording the program based on the electronic program information which has been received;
a record determination unit which determines whether or not a program to be compared with a reservation candidate program as a candidate of a program reserve-recorded by the reservation unit was perfectly recorded in past; and
a control unit which controls the reservation unit to reserve-record the reservation candidate program when the program to be compared was not perfectly recorded in past,
the apparatus prevents redundant recording of the reservation candidate program by analyzing a past broadcast occurrence pattern and a future broadcast occurrence pattern of programs that are said to be similar to the reservation candidate program,
wherein when the apparatus automatically analyzes a past broadcast occurrence pattern, and automatically considers as past broadcast occurrences those programs that are said to be similar to the reservation candidate program and that are broadcast in a detected time zone earlier than a reference time zone for the reservation candidate program on a reference date for the reservation candidate program,
wherein a program is said to be similar to the reservation candidate program when there is a match between the program and the reservation candidate program for one or more of title, genre, content description, broadcast duration, and identification information.

16. A program reservation apparatus, comprising:
a reception unit which receives a program and electronic program information;
a reservation unit which executes a reserve-recording process of recording the program based on the electronic program information which has been received;
a start time determination unit which determines whether or not a difference between a start time of the reservation candidate program and a start time of a program to be compared with the reservation candidate program is within a predetermined time; and
a control unit which causes the reservation candidate program to be reserve-recorded when the difference between the start times is within the predetermined time,
the apparatus prevents redundant recording of the reservation candidate program by analyzing a past broadcast occurrence pattern and a future broadcast occurrence pattern of programs that are said to be similar to the reservation candidate program,
wherein when the apparatus automatically analyzes a past broadcast occurrence pattern, and automatically considers as past broadcast occurrences those programs that are said to be similar to the reservation candidate program and that are broadcast in a detected time zone earlier than a reference time zone for the reservation candidate program on a reference date for the reservation candidate program,
wherein a program is said to be similar to the reservation candidate program when there is a match between the program and the reservation candidate program for one or more of title, genre, content description, broadcast duration, and identification information.

17. A program reservation apparatus, comprising:
a reception unit which receives a program and electronic program information;
a reservation unit which executes a reserve-recording process for recording the program based on the electronic program information which has been received;
a priority level assignment unit which assigns a priority level based on which the reservation unit executes the reserve-recording process to each of a plurality of time zones of the reference date on which the reservation candidate program is presented; and
a priority level determination unit which compares a time zone of the reservation candidate program with a time zone of the program to be compared with the reservation candidate program and determines whether or not the reservation candidate program is caused to be reserve-recorded corresponding to a priority level which has been assigned,
the apparatus prevents redundant recording of the reservation candidate program by analyzing a past broadcast occurrence pattern and a future broadcast occurrence pattern of programs that are said to be similar to the reservation candidate program,
wherein when the apparatus automatically analyzes a past broadcast occurrence pattern, and automatically considers as past broadcast occurrences those programs that are said to be similar to the reservation candidate program and that are broadcast in a detected time zone earlier than a reference time zone for the reservation candidate program on a reference date for the reservation candidate program, wherein a program is said to be similar to the reservation candidate program when there is a match between the program and the reservation candidate program for one or more of title, genre, content description, broadcast duration, and identification information.

18. A program reservation method for implementation by a program reservation apparatus, the method comprising:

using a system controller for receiving a program and electronic program information; and determining whether or not a reservation candidate program as a candidate of a program is caused to be reserve-recorded based on the electronic program information which has been received corresponding to a plurality of patterns of the program in a predetermined time period when the reservation candidate program to be reserve-recorded has been selected based on the electronic program information which has been received, the method prevents redundant recording of the reservation candidate program by analyzing a past broadcast occurrence pattern and a future broadcast occurrence pattern of programs that are said to be similar to the reservation candidate program, wherein when the apparatus automatically analyzes a past broadcast occurrence pattern, and automatically considers as past broadcast occurrences those programs that are said to be similar to the reservation candidate program and that are broadcast in a detected time zone earlier than a reference time zone for the reservation candidate program on a reference date for the reservation candidate program, wherein a program is said to be similar to the reservation candidate program when there is a match between the program and the reservation candidate program for one or more of title, genre, content description, broadcast duration, and identification information.

19. A program reservation apparatus, comprising:

reception means for receiving a program and electronic program information;

reservation means for executing a reserve-recording process of recording the program based on the electronic program information which has been received; and determination means for determining whether or not a reservation candidate program as a candidate of a program reserve-recorded by the reservation means is caused to be reserve-recorded corresponding to a plurality of patterns of the program in a predetermined time period, the apparatus prevents redundant recording of the reservation candidate program by analyzing a past broadcast occurrence pattern and a future broadcast occurrence pattern of programs that are said to be similar to the reservation candidate program, wherein when the apparatus automatically analyzes a past broadcast occurrence pattern, and automatically considers as past broadcast occurrences those programs that are said to be similar to the reservation candidate program and that are broadcast in a detected time zone earlier than a reference time zone for the reservation candidate program on a reference date for the reservation candidate program, wherein a program is said to be similar to the reservation candidate program when there is a match between the program and the reservation candidate program for one or more of title, genre, content description, broadcast duration, and identification information.

* * * * *